US012777542B2

(12) United States Patent
Cheng et al.

(10) Patent No.: US 12,777,542 B2
(45) Date of Patent: Oct. 27, 2026

(54) RADIO RESOURCE STATE AND RECOVERY FOR WIRELESS LOCAL AREA NETWORK AND CELLULAR NETWORK DUAL CONNECTIVITY OPERATION

(71) Applicant: QUALCOMM INCORPORATED, San Diego, CA (US)

(72) Inventors: Peng Cheng, Beijing (CN); Jianhua Liu, Beijing (CN); Gavin Bernard Horn, La Jolla, CA (US); Ozcan Ozturk, San Diego, CA (US); Aziz Gholmieh, Del Mar, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 18/566,019

(22) PCT Filed: Jul. 16, 2021

(86) PCT No.: PCT/CN2021/106696

§ 371 (c)(1),
(2) Date: Nov. 30, 2023

(87) PCT Pub. No.: WO2023/283918

PCT Pub. Date: Jan. 19, 2023

(65) Prior Publication Data

US 2024/0284533 A1 Aug. 22, 2024

(51) Int. Cl.
*H04W 76/15* (2018.01)
*H04W 24/10* (2009.01)
(Continued)

(52) U.S. Cl.
CPC ........... *H04W 76/16* (2018.02); *H04W 24/10* (2013.01); *H04W 76/19* (2018.02); *H04W 88/06* (2013.01)

(58) Field of Classification Search
CPC ..... H04W 76/16; H04W 24/10; H04W 76/19; H04W 88/06; H04W 84/12; H04W 76/15;
(Continued)

(56) References Cited

U.S. PATENT DOCUMENTS

2015/0049707 A1* 2/2015 Vajapeyam ........... H04W 24/10 370/329
2017/0170941 A1* 6/2017 Yang ..................... H04W 24/10
2017/0367141 A1 12/2017 Nagasaka et al.

FOREIGN PATENT DOCUMENTS

WO WO-2018004434 A1 1/2018

OTHER PUBLICATIONS

3GPP TS 38.331: "3rd Generation Partnership Project, Technical Specification Group Radio Access Network, NR, Radio Resource Control (RRC) Protocol Specification (Release 16)", 3GPP Standard, Technical Specification, 3rd Generation Partnership Project, Mobile Competence Centre, 650, Route Des Lucioles, F-06921 Sophia-Antipolis Cedex, France, Jul. 6, 2021, pp. 1-959, XP052030220, p. 448-p. 469.

(Continued)

*Primary Examiner* — Thai Nguyen
(74) *Attorney, Agent, or Firm* — QUALCOMM Incorporated

(57) ABSTRACT

Methods, systems, and devices for wireless communications are described. A user equipment (UE) may receive, from a network entity, control signaling indicating a configuration for establishing a dual connectivity connection. The dual connectivity connection may include a wireless local area network (WLAN) link and a cellular network link. The UE may establish the WLAN link or the cellular network link as a primary link of the dual connectivity connection. The primary link may be reconfigurable between the WLAN link and the cellular network link. The dual connectivity connection may support a single radio resource control connec- (Continued)

tion associated with the primary link between the UE and the network entity. The UE may communicate with the network entity using at least the primary link of the dual connectivity connection. The UE may support a single radio resource control state of the plurality of radio resource control states at a time.

30 Claims, 19 Drawing Sheets

(51) Int. Cl.
*H04W 76/16* (2018.01)
*H04W 76/19* (2018.01)
*H04W 88/06* (2009.01)

(58) Field of Classification Search
CPC ..... H04W 24/08; H04W 76/18; H04W 28/08; H04W 28/0231; H04W 36/00692
See application file for complete search history.

(56) References Cited

OTHER PUBLICATIONS

International Search Report and Written Opinion—PCT/CN2021/106696—ISA/EPO—Jan. 11, 2022 (2104078WO1).

* cited by examiner

1600

RADIO RESOURCE STATE AND RECOVERY FOR WIRELESS LOCAL AREA NETWORK AND CELLULAR NETWORK DUAL CONNECTIVITY OPERATION

CROSS REFERENCE

The present Application is a 371 national stage filing of International PCT Application No. PCT/CN2021/106696 by Cheng et al. entitled "RADIO RESOURCE STATE AND RECOVERY FOR WIRELESS LOCAL AREA NETWORK AND CELLULAR NETWORK DUAL CONNECTIVITY OPERATION," filed Jul. 16, 2021, which is assigned to the assignee hereof, and which is expressly incorporated by reference in its entirety herein.

FIELD OF TECHNOLOGY

The following relates to wireless communications, including radio resource state and recovery for wireless local area network and cellular network dual connectivity operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless device may be capable of communications over multiple communications links. The wireless device may implement approaches for dual connectivity over such communications links. Some methods for such dual connectivity may be deficient.

SUMMARY

The described techniques relate to improved methods, systems, devices, and apparatuses that support radio resource state and recovery for wireless local area network and cellular network dual connectivity operation. Generally, the described techniques provide for methods for radio resource state and recovery for wireless local area network and cellular network dual connectivity operation. A user equipment (UE) may receive, from a network entity, control signaling indicating a configuration for establishing a dual connectivity connection between the UE and the network entity. The dual connectivity connection may include a wireless local area network link and a cellular network link. The UE may establish the wireless local area network link or the cellular network link as a primary link of the dual connectivity connection based on the configuration. The primary link may be reconfigurable between the wireless local area network link and the cellular network link, and the dual connectivity connection may support a single radio resource control connection associated with the primary link between the UE and the network entity. The UE may communicate, according to a first radio resource control state of a plurality of radio resource control states of the dual connectivity connection, with the network entity using at least the primary link of the dual connectivity connection, wherein the UE supports a single radio resource control state of the plurality of radio resource control states at a time.

A method for wireless communications at a user equipment (UE) is described. The method may include receiving, from a network entity, control signaling indicating a configuration for establishing a dual connectivity connection between the UE and the network entity, where the dual connectivity connection includes a wireless local area network link and a cellular network link, establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity, and communicating, according to a first radio resource control state of a set of multiple radio resource control states of the dual connectivity connection, with the network entity using at least the primary link of the dual connectivity connection, where the UE supports a single radio resource control state of the set of multiple radio resource control states at a time.

An apparatus for wireless communications at a UE is described. The apparatus may include a processor, memory coupled with the processor, and instructions stored in the memory. The instructions may be executable by the processor to cause the apparatus to receive, from a network entity, control signaling indicating a configuration for establishing a dual connectivity connection between the UE and the network entity, where the dual connectivity connection includes a wireless local area network link and a cellular network link, establish the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity, and communicate, according to a first radio resource control state of a set of multiple radio resource control states of the dual connectivity connection, with the network entity using at least the primary link of the dual connectivity connection, where the UE supports a single radio resource control state of the set of multiple radio resource control states at a time.

Another apparatus for wireless communications at a UE is described. The apparatus may include means for receiving, from a network entity, control signaling indicating a configuration for establishing a dual connectivity connection between the UE and the network entity, where the dual connectivity connection includes a wireless local area network link and a cellular network link, means for establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity, and means for communicating, according to a first radio resource control state of a set of multiple radio resource control states of the dual connectivity connection, with the network entity using at least the primary link of the dual connectivity connection, where the UE supports a single radio resource control state of the set of multiple radio resource control states at a time.

A non-transitory computer-readable medium storing code for wireless communications at a UE is described. The code may include instructions executable by a processor to receive, from a network entity, control signaling indicating a configuration for establishing a dual connectivity connection between the UE and the network entity, where the dual connectivity connection includes a wireless local area network link and a cellular network link, establish the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity, and communicate, according to a first radio resource control state of a set of multiple radio resource control states of the dual connectivity connection, with the network entity using at least the primary link of the dual connectivity connection, where the UE supports a single radio resource control state of the set of multiple radio resource control states at a time.

Some examples of the method, apparatuses, and non-transitory computer-readable medium described herein may further include operations, features, means, or instructions for detecting that the cellular network link of the dual connectivity connection may have failed, transmitting, to the network entity, a report indicating the failure of the cellular network link using the wireless local area network link via a split signaling radio bearer, the report encapsulated in an internet protocol packet for delivery over the wireless local area network link, and monitoring for a response to the report from the network entity.

Some examples of the method, apparatuses, and non-transitory computer-readable medium described herein may further include operations, features, means, or instructions for starting a network response timer based on detecting that the cellular network link may have failed and transmitting a radio resource control reestablishment message based on the network response timer expiring and failing to receive a response to the report from the network entity.

In some examples of the method, apparatuses, and non-transitory computer-readable medium described herein, the cellular network link may be established as the primary link and the method, apparatuses, and non-transitory computer-readable medium may include further operations, features, means, or instructions for suspending one or more data radio bearers associated with the cellular network link and one or more signal radio bearers associated with the cellular network link.

In some examples of the method, apparatuses, and non-transitory computer-readable medium described herein, the response to the report from the network entity includes a hand-off command or an indication designating the wireless local area network link as the primary link and the response to the report may be encapsulated in a unicast internet protocol packet received over the wireless local area network link.

Some examples of the method, apparatuses, and non-transitory computer-readable medium described herein may further include operations, features, means, or instructions for transmitting the report includes transmitting one or more measurements associated with the dual connectivity connection, a failure type associated with the failure of the cellular network link, a failure cause associated with the failure of the cellular network link, or a combination thereof.

In some examples of the method, apparatuses, and non-transitory computer-readable medium described herein, the wireless local area network link may be established as the primary link and the method, apparatuses, and non-transitory computer-readable medium may include further operations, features, means, or instructions for detecting that the wireless local area network link of the dual connectivity connection may have failed, transmitting, to the network entity via a split signaling radio bearer over the cellular network link, a report indicating the failure of the wireless local area network link, and monitoring for a response to the report from the network entity.

Some examples of the method, apparatuses, and non-transitory computer-readable medium described herein may further include operations, features, means, or instructions for starting a network response timer based on detecting that the wireless local area network link may have failed and transmitting a radio resource control reestablishment message based on the network response timer expiring and failing to receive a response to the report from the network entity.

Some examples of the method, apparatuses, and non-transitory computer-readable medium described herein may further include operations, features, means, or instructions for suspending one or more data radio bearers associated with the cellular network link.

Some examples of the method, apparatuses, and non-transitory computer-readable medium described herein may further include operations, features, means, or instructions for transmitting the report includes transmitting one or more measurements associated with the dual connectivity connection, a failure type associated with the failure of the wireless local area network link, a failure cause associated with the failure of the wireless local area network link, or a combination thereof.

In some examples of the method, apparatuses, and non-transitory computer-readable medium described herein, detecting that the wireless local area network link may have failed may include operations, features, means, or instructions for detecting that a number of failed listen-before-talk attempts may be greater than or equal to a listen-before-talk threshold, detecting that a reference signal received power associated with an access point may be less than or equal to a reference signal received power threshold, or a combination thereof.

In some examples of the method, apparatuses, and non-transitory computer-readable medium described herein, the response to the report includes an indication designating the cellular network link as the primary link, a wireless local area network modification message, one or more wireless local area network access point identifiers, or a combination thereof.

In some examples of the method, apparatuses, and non-transitory computer-readable medium described herein, the cellular network link may be established as the primary link and the method, apparatuses, and non-transitory computer-readable medium may include further operations, features, means, or instructions for detecting that the wireless local area network link of the dual connectivity connection may have failed, monitoring for an available wireless local area network access point, transmitting, to the network entity via a split signaling radio bearer, a report indicating the failure of the wireless local area network link, the report including information associated with the failure of the wireless local area network link, and monitoring for a response to the report from the network entity.

Some examples of the method, apparatuses, and non-transitory computer-readable medium described herein may further include operations, features, means, or instructions for associating with the available wireless local area network access point, where transmitting the report may be based on the associating and where the information associated with the failure of the wireless local area network link includes information associated with the associated available wireless local area network access point.

In some examples of the method, apparatuses, and non-transitory computer-readable medium described herein, the information associated with the associated available wireless local area network access point includes an identifier of the associated available wireless local area network access point.

Some examples of the method, apparatuses, and non-transitory computer-readable medium described herein may further include operations, features, means, or instructions for failing to associate with the available wireless local area network access point and where transmitting the report includes transmitting the report over the cellular network link.

Some examples of the method, apparatuses, and non-transitory computer-readable medium described herein may further include operations, features, means, or instructions for starting a network response timer based on detecting that the wireless local area network connection may have failed and transmitting a radio resource control reestablishment message based on the network response timer expiring and failing to receive a response to the report from the network entity.

Some examples of the method, apparatuses, and non-transitory computer-readable medium described herein may further include operations, features, means, or instructions for suspending one or more data radio bearers associated with the cellular network link.

In some examples of the method, apparatuses, and non-transitory computer-readable medium described herein, the information associated with the failure of the wireless local area network link includes one or more measurements associated with the dual connectivity connection, a failure type associated with the failure of the wireless local area network link, a failure cause associated with the failure of the wireless local area network link, or a combination thereof.

Some examples of the method, apparatuses, and non-transitory computer-readable medium described herein may further include operations, features, means, or instructions for detecting that the wireless local area network link may have failed further includes detecting that a number of failed listen-before-talk attempts may be greater than or equal to a listen-before-talk threshold, detecting that a reference signal received power associated with an access point may be less than or equal to a reference signal received power threshold, or a combination thereof.

In some examples of the method, apparatuses, and non-transitory computer-readable medium described herein, the response to the report includes a wireless local area network modification message, one or more wireless local area network access point identifiers, or a combination thereof.

A method for wireless communications at a network entity is described. The method may include transmitting, to a UE, control signaling indicating a configuration for establishing a dual connectivity connection between the UE and the network entity, where the dual connectivity connection includes a wireless local area network link and a cellular network link, establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity, and communicating, according to a first radio resource control state of a set of multiple radio resource control states of the dual connectivity connection, with the UE using at least the primary link of the dual connectivity connection, where the UE supports a single radio resource control state of the set of multiple radio resource control states at a time.

An apparatus for wireless communications at a network entity is described. The apparatus may include a processor, memory coupled with the processor, and instructions stored in the memory. The instructions may be executable by the processor to cause the apparatus to transmit, to a UE, control signaling indicating a configuration for establishing a dual connectivity connection between the UE and the network entity, where the dual connectivity connection includes a wireless local area network link and a cellular network link, establish the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity, and communicate, according to a first radio resource control state of a set of multiple radio resource control states of the dual connectivity connection, with the UE using at least the primary link of the dual connectivity connection, where the UE supports a single radio resource control state of the set of multiple radio resource control states at a time.

Another apparatus for wireless communications at a network entity is described. The apparatus may include means for transmitting, to a UE, control signaling indicating a configuration for establishing a dual connectivity connection between the UE and the network entity, where the dual connectivity connection includes a wireless local area network link and a cellular network link, means for establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity, and means for communicating, according to a first radio resource control state of a set of multiple radio resource control states of the dual connectivity connection, with the UE using at least the primary link of the dual connectivity connection, where the UE supports a single radio resource control state of the set of multiple radio resource control states at a time.

A non-transitory computer-readable medium storing code for wireless communications at a network entity is described. The code may include instructions executable by a processor to transmit, to a UE, control signaling indicating a configuration for establishing a dual connectivity connection between the UE and the network entity, where the dual connectivity connection includes a wireless local area network link and a cellular network link, establish the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity, and communicate, according to a first radio resource control state of a set of multiple radio resource control states of the dual connectivity connection, with the UE using at least the primary link of the dual connectivity connection, where the UE supports a single radio resource control state of the set of multiple radio resource control states at a time.

Some examples of the method, apparatuses, and non-transitory computer-readable medium described herein may further include operations, features, means, or instructions for determining the single radio resource control state based on an assessment of both the wireless local area network link and the cellular network link or based on an assessment of the primary link.

Some examples of the method, apparatuses, and non-transitory computer-readable medium described herein may further include operations, features, means, or instructions for receiving, from the UE, a report indicating the failure of the cellular network link using the wireless local area network link via a split signaling radio bearer, the report encapsulated in an internet protocol packet for delivery over the wireless local area network link and transmitting, to the UE, a response to the report.

In some examples of the method, apparatuses, and non-transitory computer-readable medium described herein, the wireless local area network link may be established as the primary link and the method, apparatuses, and non-transitory computer-readable medium may include further operations, features, means, or instructions for receiving, from the UE via a split signaling radio bearer over the cellular network link, a report indicating the failure of the wireless local area network link and transmitting, to the UE, a response to the report.

In some examples of the method, apparatuses, and non-transitory computer-readable medium described herein, the cellular network link may be established as the primary link and the method, apparatuses, and non-transitory computer-readable medium may include further operations, features, means, or instructions for receiving, from the UE via a split signaling radio bearer, a report indicating the failure of the wireless local area network link, the report including information associated with the failure of the wireless local area network link and transmitting, to the UE, a response to the report.

DETAILED DESCRIPTION

Figure 1:
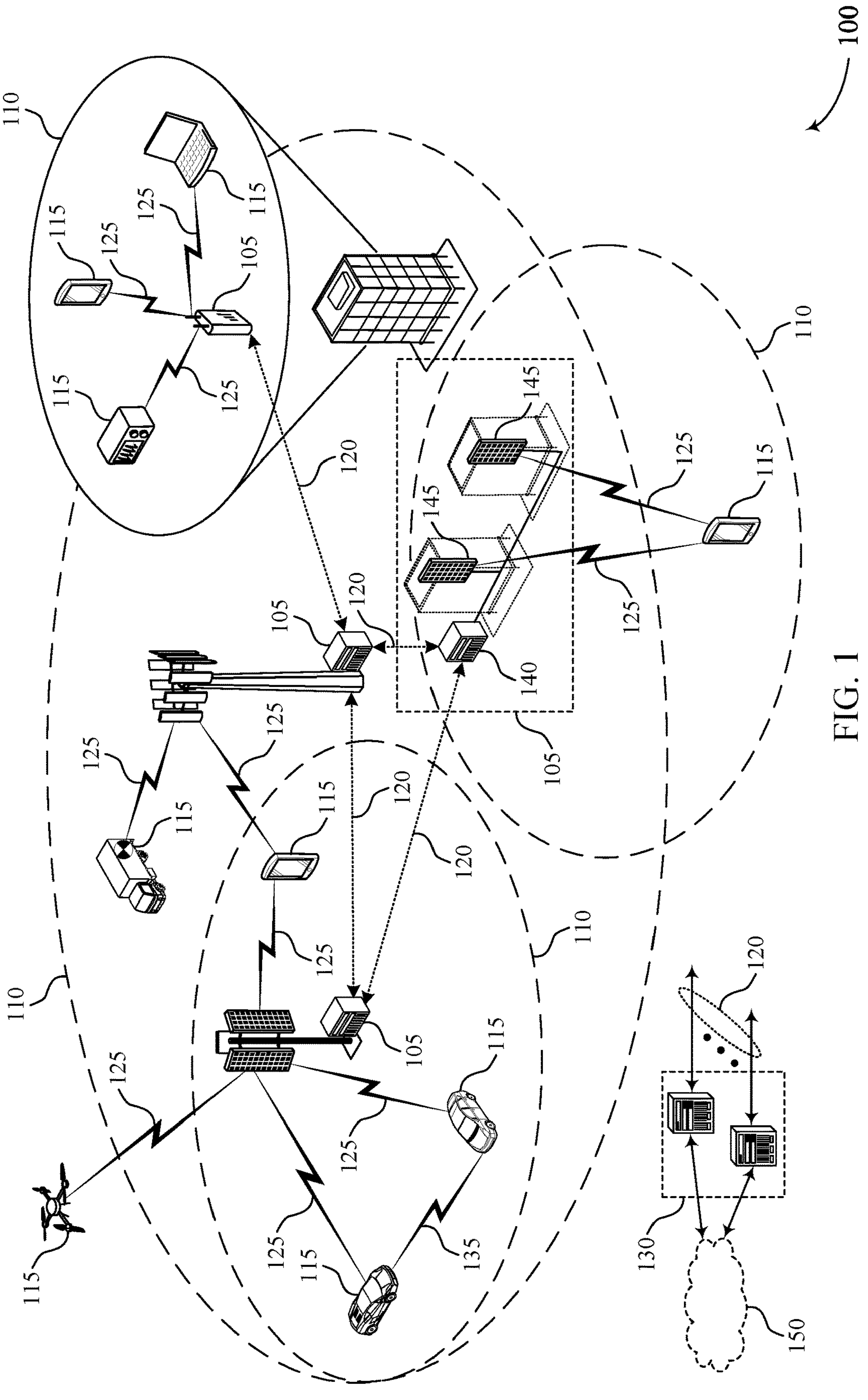
FIG. 1 illustrates an example of a wireless communications system that supports radio resource state and recovery for wireless local area network and cellular network dual connectivity operation in accordance with aspects of the present disclosure.

A UE may establish a connection with a network entity (e.g., a gNB control unit (CU) or a gNB distributed unit (DU)) and communicate with the network entity over multiple links using different radio access technologies (e.g., a cellular network link such as an NR cellular network link and a wireless local area network (WLAN) link) using a dual connectivity connection. Such communications may involve the use of a radio resource control (RRC) connection having one or more RRC states (e.g., RRC_IDLE or RRC_CONNECTED). During the course of communications, one of the links may fail. Current techniques for dual connectivity communications may be unable or may not be configured to determine an RRC state for the dual connectivity connection involving an NR and WLAN links, to employ a link recovery procedure after link failure, or to employ a re-establishment procedure in case of recovery failure.

In the course of communications involving a dual connectivity connection (e.g., involving an NR link and an 802.11 WLAN link), a primary connection may be established. The UE, network entity, or other device may establish either link to be the primary link. The UE may employ a single RRC connection with a network entity over both links of the dual connectivity connection. The UE may have only a single RRC state (e.g., RRC_IDLE or RRC_CONNECTED), and the UE may determine an RRC state considering both links, or may determine the RRC state using the primary link only. The UE may report link failure of one of the links in the dual connectivity connection. The UE may perform RRC establishment (e.g., if both links fail).

The UE may perform various procedures upon link failure. In some examples involving cellular network link failure, the UE may report the failure over the WLAN link (e.g., to a network entity). In some examples, the network entity may indicate to the UE to designate a new primary connection or to perform and inter-DU handoff procedure. The UE may perform RRC re-establishment (e.g., if the UE receives no response to the report). In some examples involving WLAN link failure when the WLAN link has been designated as the primary link, the UE may report such a failure (e.g., to a network entity). The UE may receive an indication (e.g., from the network entity) to switch to the cellular network link. The UE may perform RRC re-establishment (e.g., if the UE receives no response to the report). In some examples involving WLAN failure when the cellular network link has been designated as the primary link, the UE may search for a WLAN access point to connect to, and may connect to a new WLAN access point or may report failure of the link. The UE may perform RRC re-establishment (e.g., if the UE receives no response to the report).

Aspects of the disclosure are initially described in the context of wireless communications systems. Aspects of the disclosure are then illustrated by example wireless communications systems and a process flow. Aspects of the disclosure are further illustrated by and described with reference to apparatus diagrams, system diagrams, and flowcharts that relate to radio resource state and recovery for wireless local area network and cellular network dual connectivity operation.

FIG. 1 illustrates an example of a wireless communications system 100 that supports radio resource state and recovery for wireless local area network and cellular network dual connectivity operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In the course of communications involving a dual connectivity connection the UE may receive control signaling that may include a configuration for the dual connectivity connection. The UE, a network entity, or another device may establish either link (e.g., the cellular network link or the WLAN link) to be the primary link. The UE may employ a single RRC connection with a network entity over both links of the dual connectivity connection. The UE and the network entity may communicate based on an RRC state, and the UE may support a single RRC state at a time. In some examples, the UE may detect that a link of the dual connectivity connection has failed. As such, the UE may perform a failure procedure. For example, the UE may transmit (e.g., to the network entity or other device) a failure report that may indicate that the link has failed, and the UE may monitor for a response from the network entity or other device. In some cases, if the failed link is a WLAN link, the UE may monitor for or attempt to connect to an available access point to reestablish the WLAN connection. In some examples, the response to the failure report may include one or more instructions related to a reestablishment procedure.

Figure 2:
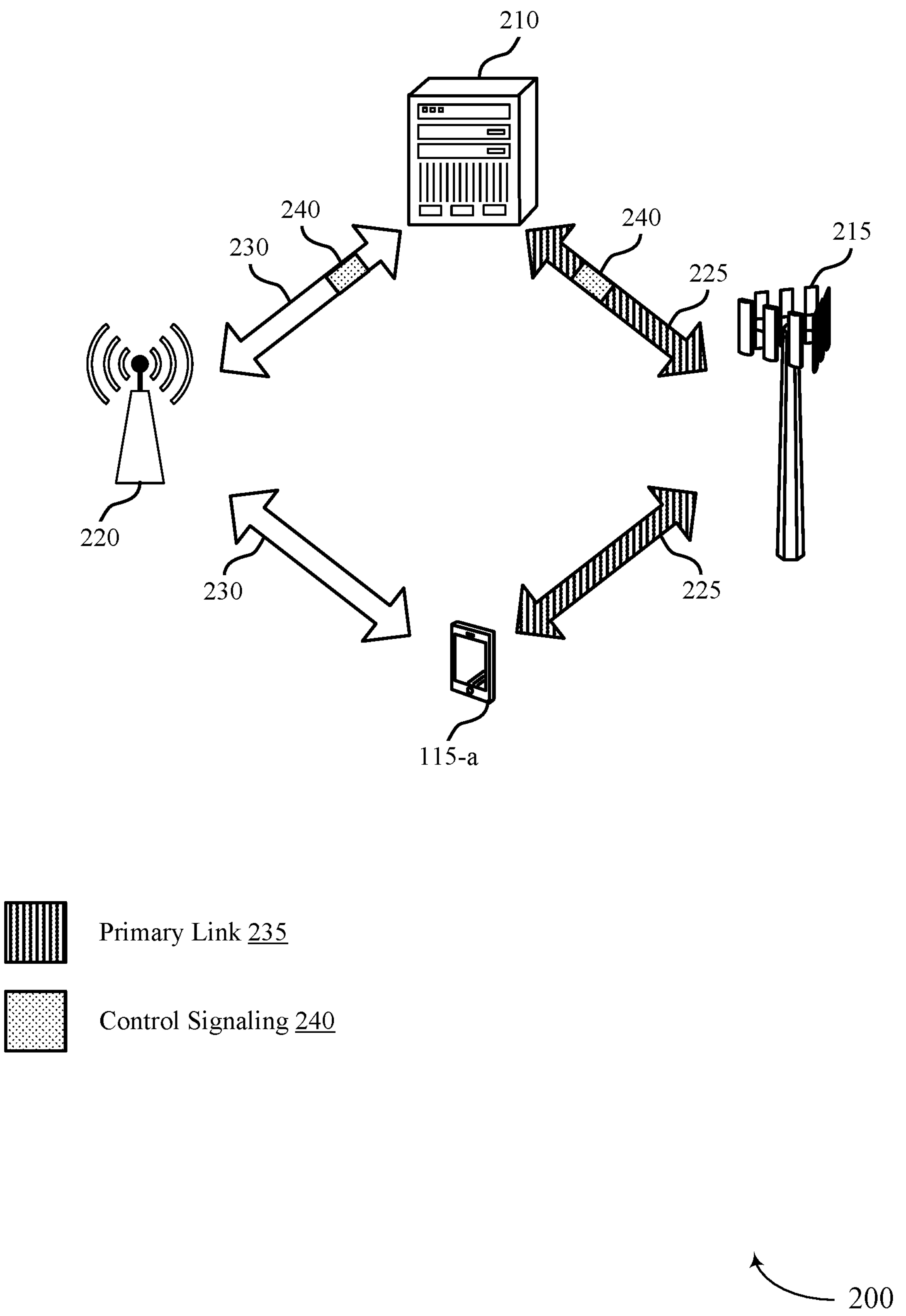
FIG. 2 illustrates an example of a wireless communications system that supports radio resource state and recovery for wireless local area network and cellular network dual connectivity operation in accordance with aspects of the present disclosure.

FIG. 2 illustrates an example of a wireless communications system 200 that supports radio resource state and recovery for wireless local area network and cellular network dual connectivity operation in accordance with aspects of the present disclosure. The wireless communications system 200 may include UE 115-*a*, which may be an example of UE 115 described in relation to FIG. 1.

The wireless communications system 200 may include one or more network entities such as the CU 210 and the DU 215. The network entity may be an example of an element of a gNB (e.g., a gNB control unit (CU) or a gNB distributed unit (DU)). Though the example of FIG. 2 (as well as other examples discussed herein) may discuss communications in relation to the CU 210 and the DU 215, it is to be understood that such discussions apply equally to other examples of network entities. For example, references to a network entity may indicate a gNB CU, a gNB DU, a base station, or other device operating in a wireless communications system. Also, it is to be understood that, while some discussion may refer specifically to the CU 210, the discussion applies equally to other network entities.

In some examples, the wireless communications system 200 may include a base station (e.g., base station 105 discussed in relation to FIG. 1). In some examples, a gNB or base station may support a FDD mode, a TDD mode, or dual mode operations. In some examples, multiple gNBs or base stations may be interconnected through an Xn interface. In some examples, a base station may include the CU 210, the DU 215, or a combination thereof, which may be examples of the corresponding devices described herein. For example, CU 210 and/or DU 215 may be functions/components implemented at, implemented by, or otherwise associated with base station 205.

In some examples, the CU 210 may manage aspects of one or more DU(s) 215. DU 215 may generally implement the L1 functionality of a RAN, e.g., where the radio frequency signals are transmitted/received, amplified, digitized, etc. In some examples, within the DU/CU split architecture, the CU 210 may be connected to the DU 215 via a wired connection utilizing an F1 interface. In some deployments, the DU 215 may implement aspects of the layer one (possibly some layer two) functionality for wireless communications between base station and UE 115-*a*, with CU 210 managing at least a portion of the higher layer (e.g., layer two and/or layer three) functionality for such communications. That is, the DU 215 may perform wireless communications with the UE 115-*a*, which may then pass the information/data to the base station via CU 210.

However, in some deployment scenarios the CU/DU split architecture may also be implemented within, or otherwise implement, an integrated access and backhaul (IAB) network. For example, the DU 215 may be remote from CU 210 and may communicate with CU 210 wirelessly (e.g., using a Uu interface). For example, CU 210 may communicate wirelessly with DU 215. In such a CU/DU split/IAB deployment scenario, each DU 215 may also be equipped with, or otherwise support, a mobile terminal (MT) function. The MT function may manage aspects of wireless communications between DU 215 and the UE 115-*a*. For example, the MT function of DU 215 may communicate wirelessly using a Uu interface with UE 115-*a*. In some examples, the DU function in this context may manage aspects of the wireless backhaul interface (e.g., the IAB network communications), as discussed above (e.g., wirelessly using the Uu function).

In some examples, the UE 115-*a* may communicate with the CU 210 via one or more communications links (e.g., using a dual connectivity connection). For example, the UE 115-*a* may communicate with CU 210 via a cellular network link 225, a WLAN link 230, or both. As described herein, the UE 115-*a* may communicate with the CU 210 via the DU 215 and the cellular network link 225, and the UE 115-*a* may also communicate with the CU 210 via an access point 220 and the WLAN link 230. Although the example of a dual connectivity connection using a cellular network link and a WLAN link is provided, it is to be understood that the dual connectivity connection may involve additional or alternative radio access technology connections.

In some examples, in the course of communications in a dual connectivity connection context, the UE, the CU 210, the DU 215, or other device may establish a first communications link to be the primary link. In the example depicted in FIG. 2, the cellular network link 225 may be established as the primary link 235. In some examples, the primary link 235 may be responsible for one or more procedures (e.g., an initial access procedure, an RRC transmission procedure, or one or more other wireless communication procedures). However, in some examples, after a primary link 235 is established, the CU 210, the DU 215, the UE 115-*a* or other device may reconfigure another link as the primary link 235 (e.g., the WLAN link 230 may be established as the primary connection). In some examples, the UE 115-*a* may reassign or re-designate the primary link 235 while in an RRC connected state (e.g., RRC_CONNECTED).

In some examples, the UE 115-*a* may employ a RRC connection with the CU 210, even though the UE 115-*a* may be communicating with the CU 210 via multiple links (e.g., the cellular network link 225 and the WLAN link 230). In some examples, the UE 115-*a* may only support a single RRC state at a time (e.g., RRC_IDLE, RRC_CONNECTED, or another RRC state). In some examples, the UE 115-*a* may determine an RRC state by considering multiple links (e.g., the cellular network link 225 and the WLAN link 230). In some such examples, the UE 115-*a* may transmit a signaling radio bearer (SRB) via duplication, fast link activation, fast link deactivation, another SRB procedure, or a combination thereof. In other examples, the UE 115-*a* may determine the RRC state or one or more other RRC parameters by considering the primary link 235 (e.g., the cellular network link 225). In some examples, a network entity (e.g., the CU 210) may determine a single RRC state (e.g., for the UE 115-*a*) based on an assessment of the WLAN link 230, the cellular network link 225, a combination of the WLAN link 230 and the cellular network link 225, the primary link 235, or a combination thereof.

In some examples in a dual connectivity connection context, the UE 115-*a* may report failure of one of the links to the CU 210 over another available link to recover. For example, if the cellular network link 225 were to fail, the UE

115-*a* may report failure of the cellular network link 225 over the WLAN link 230, and if the WLAN link 230 were to fail, the UE 115-*a* may report failure of the cellular network link 225 over the cellular network link 225. In some examples, if both links were to fail, the UE 115-*a* may perform an RRC reestablishment procedure (e.g., to restore communication with the CU 210).

In some examples, the UE 115-*a* may receive control signaling 240 (e.g., from the CU 210, the DU 215, or another device). The control signaling 240 may indicate a configuration for the dual connectivity connection between the UE 115-*a* and the CU 210 (or other network entity). For example, and as depicted in FIG. 2, the dual connectivity connection may include the cellular network link 225 and the WLAN link 230. In some examples, the UE 115-*a* may establish either the cellular network link 225 or the WLAN link 230 as the primary link 235 of the dual connectivity connection. In some examples, the UE 115-*a* may do so based on one or more factors (e.g., the configuration, whether the configuration is indicated in the control signaling 240 or received by other means). In some examples, the primary link 235 may be reconfigurable, re-assignable, adjustable, or otherwise capable of modification (e.g., the primary link 235 may be reconfiguration between the cellular network link 225 and the WLAN link 230). In some examples, the dual connectivity connection may support a single RRC connection, and the single RRC connection may be associated with the primary link 235. In some examples, the UE 115-*a* may communicate with the CU 210 according to a first RRC state of a plurality of RRC states. In some examples, the plurality of RRC states may be associated with the dual connectivity connection. In some examples, the network entity (e.g., the CU 210) may use at least the primary link 235 of the dual connectivity connection. In some examples, the UE 115-*a* may support a single RRC state of the plurality of RRC states at a time.

Figure 3:
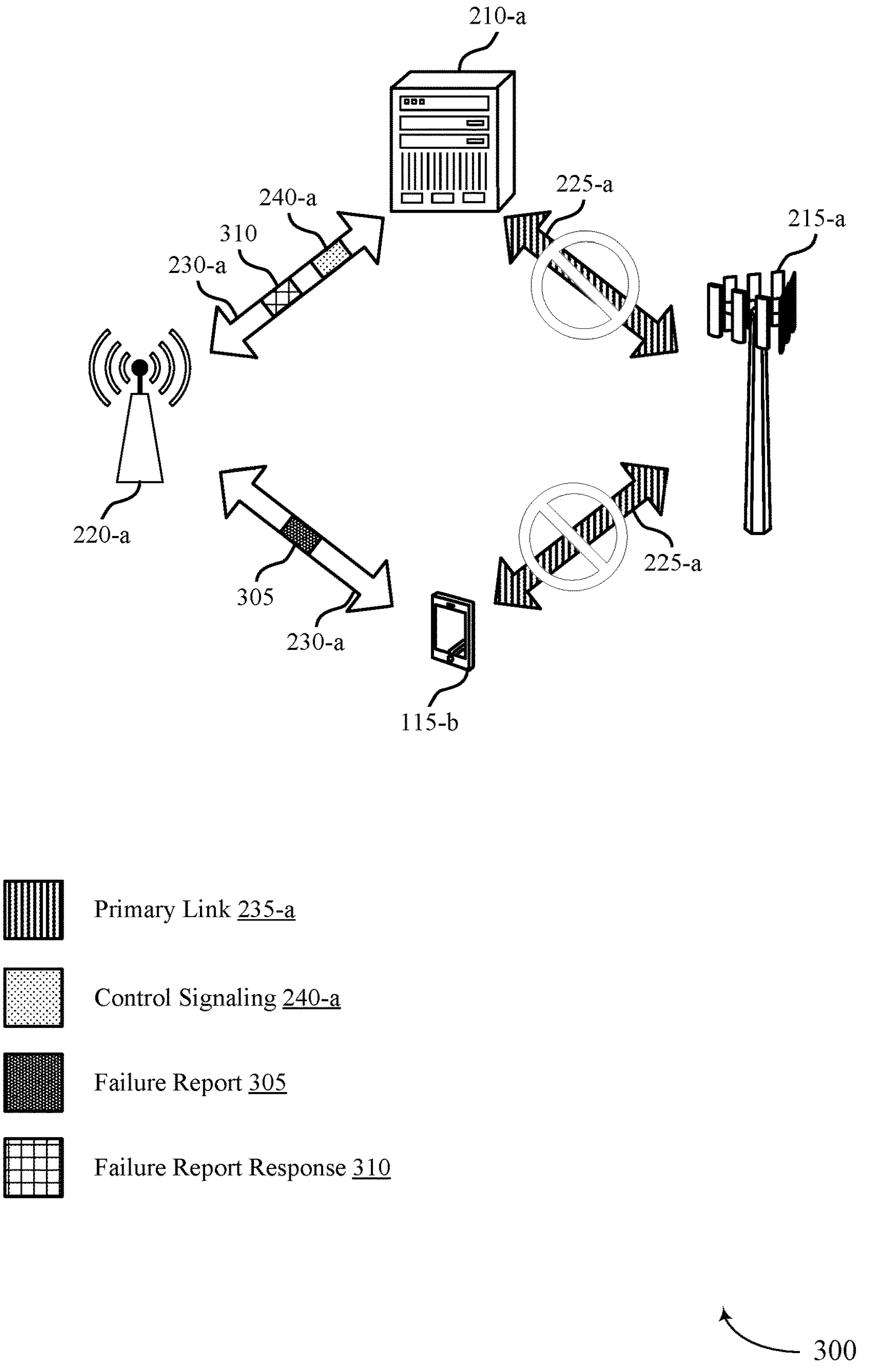
FIG. 3 illustrates an example of a wireless communications system that supports radio resource state and recovery for wireless local area network and cellular network dual connectivity operation in accordance with aspects of the present disclosure.

FIG. 3 illustrates an example of a wireless communications system 300 that supports radio resource state and recovery for wireless local area network and cellular network dual connectivity operation in accordance with aspects of the present disclosure. The wireless communications system 300 may include or involve UE 115-*b*, CU 210-*a*, DU 215-*a*, access point 220-*a*, cellular network link 225-*a*, WLAN link 230-*a*, and control signaling 240-*a*, which may be examples of UE 115-*a* (or UE 115), CU 210, DU 215, access point 220, cellular network link 225, WLAN link 230, control signaling 240, or a combination thereof as described herein.

In some examples, the UE 115-*b* may engage in communications using a dual connectivity connection involving cellular network link 225-*a* and WLAN link 230-*a*. In some examples, and as depicted in FIG. 3, the UE 115-*b* may designate a primary link 235-*a*, which, in this case, is the cellular network link 225-*a*. However, the discussion herein relating to FIG. 3 may also apply to a situation in which the WLAN link 230-*a* may be designated as the primary link 235-*a*.

In some examples, the UE 115-*b* may measure, determine, compute, or otherwise obtain an indication that the cellular network link 225-*a* has failed. In some examples, if the cellular network link 225-*a* is designated or assigned as the primary link 235-*a*, the UE 115-*b* may suspend one or more data radio bearers associated with the cellular network link 225-*a* and one or more signaling radio bearers associated with the cellular network link 225-*a*. In some examples, the UE 115-*b* may report an indication of the failure of the cellular network link 225-*a* (e.g., in a failure report such as failure report 305-*a*). In some examples, the failure report 305-*a* may be transmitted (e.g., to the CU 210-*a* or other device) over the WLAN link 230-*a*. In some examples, the failure report 305 may be transmitted via a split signaling radio bearer (e.g., in an attempt to recover the cellular network link 225-*a*). In some examples, the failure report 305 or the indication of the failure of the cellular network link 225-*a* may include one or more measurements (e.g., measurements associated with the cellular network link 225-*a*, the WLAN link 230-*a*, or both), a failure type, a failure cause, other information associated with the failure, or a combination thereof. In some examples, the failure report 305 may be encapsulated in a unicast ethernet or internet protocol (IP) packet transmitted over the WLAN link 230-*a*.

In some examples, the CU 210-*a* may receive the failure report 305. In some such examples, the CU 210-*a* may provide or transmit (e.g., to the UE 115-*b*) a failure report response 310. In some examples, the failure report response 310 may include a handoff command (e.g., a handoff command for an inter-DU handoff). Such a handoff command may be encapsulated in a unicast ethernet or IP packet transmitted over the WLAN link 230-*a*. Additionally or alternatively, the failure report response 310 may include a role-switching command or indicate a role-switching operation. For example, if the cellular network link 225-*a* was designated as the primary link 235-*a*, the CU 210-*a* may designate the WLAN link 230-*a* to be the primary link 235-*a* (e.g., by including a primary link 235-*a* reassignment or modification command or indication in the failure report response 310). In some examples, the handoff command or a command or indication associated with the role-switching may be encapsulated in a unicast ethernet or IP packet transmitted over the WLAN link 230-*a*.

In some examples, the UE 115-*b* may start a timer, such as a network response timer based on detecting that the cellular network link 225-*a* has failed. For example, the UE 115-*b* may use such a timer to select, measure, determine, compute, or otherwise obtain a time period in which the CU 210-*a* is to respond to the failure report 305). In some cases, the UE 115-*b* may receive the failure report response 310. In some such cases, the UE 115-*b* may stop, terminate, or reset the timer, and may perform one or more operations based on the failure report response 310 or a command or indication included therein (e.g., the UE 115-*b* may reassign the primary link 235-*a* or perform or participate in a handoff operation). However, in some cases (e.g., if the CU 210 fails to respond or transmit the failure report response 310), the timer may reach a predetermined or configured timer threshold (e.g., configured in the configuration received in the control signaling 240-*a*). In some such cases, the UE 115-*b* may determine that both the WLAN link 230-*a* and the cellular network link 225-*a* have failed. As such, the UE 115-*b* may transmit a radio resource control reestablishment message (e.g., to reestablish communications with the CU 210-*a*) based on (in some examples) the timer expiring or reaching the timer threshold, failing to receive a response to the failure report 305-*a* (e.g., the failure report response 310), or a combination thereof.

Figure 4:
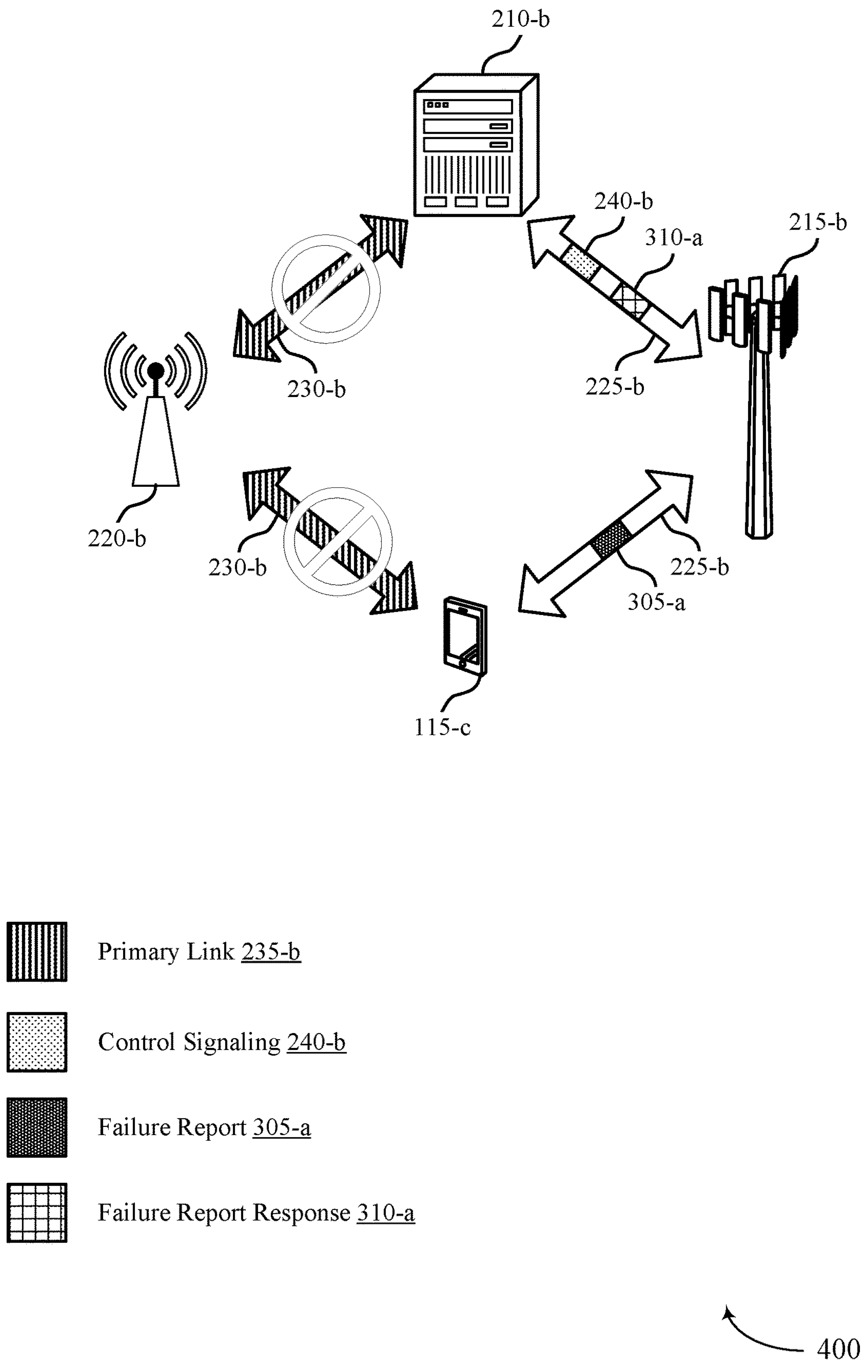
FIG. 4 illustrates an example of a wireless communications system that supports radio resource state and recovery for wireless local area network and cellular network dual connectivity operation in accordance with aspects of the present disclosure.

FIG. 4 illustrates an example of a wireless communications system 400 that supports radio resource state and recovery for wireless local area network and cellular network dual connectivity operation in accordance with aspects of the present disclosure. The wireless communications system 400 may include or involve UEs 115-*c*, CU 210-*b*, DU 215-*b*, access point 220-*b*, cellular network link 225-*b*, WLAN link 230-*b*, control signaling 240-*b*, failure report

305-*a*, and failure report response 310-*a* which may be examples of UE 115-*b*, 115-*a*, or UE 115, CU 210-*a* or 210, DU 215-*a* or 215, access point 220-*a* or 220, cellular network link 225-*a* or 225, WLAN link 230-*a* or 230, control signaling 240-*a* or 240, failure report 305, failure report response 310, or a combination thereof as described herein.

In some examples, the UE 115-*c* may engage in communications using a dual connectivity connection involving cellular network link 225-*b* and WLAN link 230-*b*. In some examples, and as depicted in FIG. 4, the UE 115-*c* (or other device, such as CU 210-*b*) may determine, select, assign, or designate a primary link 235-*b*, which, in this case depicted in FIG. 4, is the WLAN link 230-*b*. As the WLAN link 230-*b* may be designated or assigned as the primary link 235-*b*, the UE 115-*c*, the CU 210-*b*, one or more other devices, or a combination thereof may perform one or more of the various operations or actions described herein in relation to FIG. 4 based on the WLAN link 230-*b* being designated or assigned as the primary link 235-*b*.

In some examples, the UE 115-*c* may measure, determine, compute, or otherwise obtain an indication that the WLAN link 230-*b* has failed. In some examples, the UE 115-*c* may do so based on one or more factors. The one or more factors may include a number of failed listen-before-talk attempts that my be greater than or equal to a listen-before-talk threshold, a reference signal received power associated with an access point (e.g., access point 220-*b*) that may be less than or equal to a reference signal received power threshold, one or more additional failure factors, or a combination thereof.

In some examples, the UE 115-*c* may, based on the failure of the WLAN link 230-*b*, suspend one or more data radio bearers that may or may not be associated with the cellular network link 225-*b* (e.g., an end-to-end data radio bearer), one or more signaling radio bearers (e.g., one or more signaling radio bearers terminated in the CU 210-*b*).

In some examples, the UE 115-*c* may report an indication of the failure of the WLAN link 230-*b* (e.g., in a failure report such as failure report 305-*a*-*a*). In some examples, the failure report 305-*a* may be transmitted (e.g., to the CU 210-*b* or other device) over the cellular network link 225-*b*. In some examples, the failure report 305-*a* may be transmitted via a split signaling radio bearer (e.g., in an attempt to recover the WLAN link 230-*b*). In some examples, the failure report 305-*a* or the indication of the failure of the WLAN link 230-*b* may include one or more measurements (e.g., measurements associated with the cellular network link 225-*b*, the WLAN link 230-*b*, or both), a failure type, a failure cause, other information associated with the failure, or a combination thereof.

In some examples, the CU 210-*b* may receive the failure report 305-*a*. In some such examples, the CU 210-*b* may provide or transmit (e.g., to the UE 115-*c*) a failure report response 310-*a*. In some examples, the failure report response 310-*a* may include RRC signaling. The RRC signaling may include signaling associated with a role-switch operation regarding the designation or assignment of the primary link 235-*b*. For example, the RRC signaling may indicate that the cellular network link 225-*b* is to be designated or assigned as the primary link 235-*b*. Additionally or alternatively, the RRC signaling may include a WLAN modification message (e.g., a message or command indicating one or more elements associated with an attempt to reconnect to the access point 220-*b* or otherwise recover the failed WLAN link 230-*b*) or a new access point identifier (e.g., an access point identifier associated with another access point for the UE 115-*c* to connect to instead of attempting to reconnect to the access point 220-*b*). In some examples, the RRC signaling may be transmitted over the cellular network link 225-*b*.

In some examples, the UE 115-*c* may start a timer, such as a network response timer based on detecting that the WLAN link 230-*b* has failed. For example, the UE 115-*c* may use such a timer to select, measure, determine, compute, or otherwise obtain a time period in which the CU 210-*b* is to respond to the failure report 305-*a*. In some cases, the UE 115-*c* may receive the failure report response 310-*a*. In some such cases, the UE 115-*c* may stop, terminate, or reset the timer, and may perform one or more operations based on the failure report response 310-*a* or a command or indication included therein (e.g., the UE 115-*c* may reassign the primary link 235-*b*, attempt to recover the WLAN link 230-*b* by reconnecting to the access point 220-*b*, attempt to recover the WLAN link 230-*b* by attempting to connect to another access point, perform another recovery operation, or a combination thereof). However, in some cases (e.g., if the CU 210 fails to respond or transmit the failure report response 310-*a*), the timer may reach a predetermined or configured timer threshold (e.g., configured in the configuration received in the control signaling 240-*b*). In some such cases, the UE 115-*c* may measure, determine, compute, or otherwise obtain an indication that both the WLAN link 230-*b* and the cellular network link 225-*b* have failed. As such, the UE 115-*c* may transmit a radio resource control reestablishment message (e.g., to reestablish communications with the CU 210-*b*) based on (in some examples) the timer expiring or reaching the timer threshold, failing to receive a response to the failure report 305-*a*-*a* (e.g., the failure report response 310-*a*), or a combination thereof.

Figure 5:
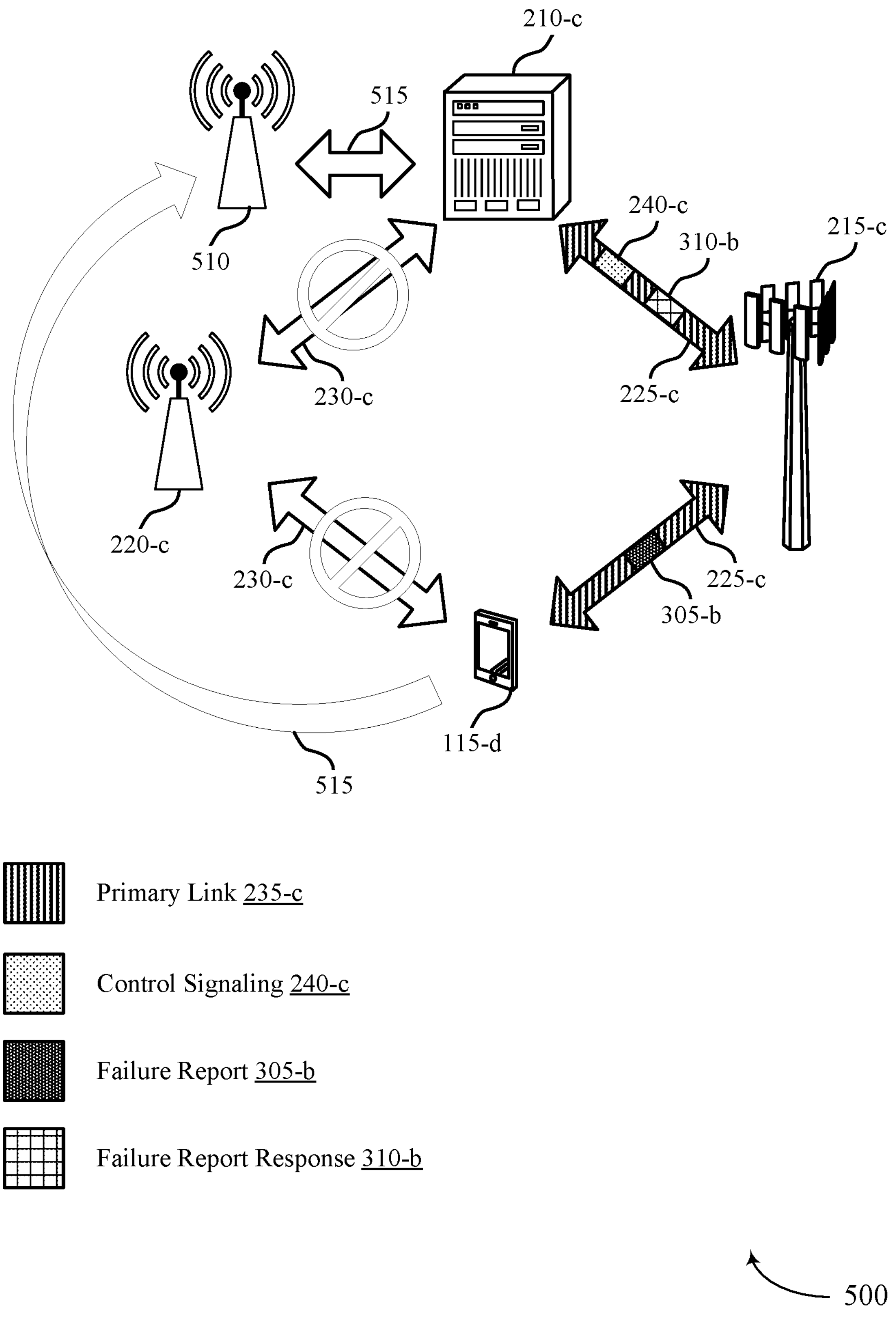
FIG. 5 illustrates an example of a wireless communications system that supports radio resource state and recovery for wireless local area network and cellular network dual connectivity operation in accordance with aspects of the present disclosure.

FIG. 5 illustrates an example of a wireless communications system 500 that supports radio resource state and recovery for wireless local area network and cellular network dual connectivity operation in accordance with aspects of the present disclosure. The wireless communications system 500 may include or involve UEs 115-*d*, CU 210-*c*, DU 215-*c*, access point 220-*c*, cellular network link 225-*c*, WLAN link 230-*c*, control signaling 240-*c*, failure report 305-*b*, failure report response 310-*b*, which may be examples of UE 115-*c*, 115-*b*, 115-*a*, or UE 115, CU 210-*b*, 210-*a* or 210, DU 215-*b*, 215-*a* or 215, access point 220-*b*, 220-*a* or 220, cellular network link 225-*b*, 225-*a* or 225, WLAN link 230-*b*, 230-*a* or 230, control signaling 240-*b*, 240-*a* or 240, failure report 305-*a* or 305, failure report response 310-*a* or 310, or a combination thereof as described herein.

The example depicted in FIG. 5 may be similar in some aspects to the example of FIG. 4. However, in the example depicted in FIG. 5, the cellular network link 225-*c* may be designated as the primary link 235-*b*. As such, the various devices may perform the same, similar, or different procedures as compared to the example of FIG. 4 (or the other examples discussed herein).

In some examples, the UE 115-*d* may engage in communications using a dual connectivity connection involving cellular network link 225-*c* and WLAN link 230-*c*. In some examples, and as depicted in FIG. 5, the UE 115-*d* (or other device, such as CU 210-*c*) may determine, select, assign, or designate a primary link 235-*c*, which, in this case depicted in FIG. 5, is the cellular network link 225-*c*. As the cellular network link 225-*c* may be designated or assigned as the primary link 235-*c*, the UE 115-*d*, the CU 210-*c*, one or more other devices, or a combination thereof may perform one or more of the various operations or actions described herein in relation to FIG. 5 based on the cellular network link 225-*c* being designated or assigned as the primary link 235-*c*.

In some examples, the UE 115-*d* may measure, determine, compute, or otherwise obtain an indication that the WLAN link 230-*c* has failed. In some examples, the UE 115-*d* may do so based on one or more factors. The one or more factors may include a number of failed listen-before-talk attempts that my be greater than or equal to a listen-before-talk threshold, a reference signal received power associated with an access point (e.g., access point 220-*c*) that may be less than or equal to a reference signal received power threshold, one or more additional failure factors, or a combination thereof.

In some examples, the UE 115-*d* may (e.g., based on detecting or determining failure of the WLAN link 230-*c*), the UE 115-*d* may attempt to identify, select, determine, or otherwise obtain one or more additional WLAN access point identifiers (e.g., an identifier associated with access point 510 as depicted in FIG. 5). In some examples, if the UE 115-*d* is successful in identifying, selecting, determining, or otherwise obtaining one or more additional WLAN access point identifiers, the UE 115-*d* may initiate WLAN association (e.g., by associating with access point 510 via WLAN link 515). In some such cases, the UE 115-*d* may transmit information associated with the newly associated access point (e.g., access point 510) via a split signaling radio bearer (e.g., to the CU 210-*c* to notify the CU 210-*c* about the new WLAN association).

Additionally or alternatively, (e.g., if the UE 115-*d* is not successful in in identifying, selecting, determining, or otherwise obtaining one or more additional WLAN access point identifiers or associating with another access point such as access point 510), the UE 115-*d* may report an indication of the failure of the WLAN link 230-*c* (e.g., in a failure report such as failure report 305-*b*). In some examples, the failure report 305-*b* may be transmitted (e.g., to the CU 210-*c* or other device) over the cellular network link 225-*c*. In some examples, the failure report 305-*b* may be transmitted via a split signaling radio bearer (e.g., in an attempt to recover the WLAN link 230-*c*). In some examples, the failure report 305-*b* or the indication of the failure of the WLAN link 230-*c* may include one or more measurements (e.g., measurements associated with the cellular network link 225-*c*, the WLAN link 230-*c*, or both), a failure type, a failure cause, other information associated with the failure, or a combination thereof.

In some examples, the CU 210-*c* may receive the failure report 305-*b*. In some such examples, the CU 210-*c* may provide or transmit (e.g., to the UE 115-*d*) a failure report response 310-*b*. In some examples, the failure report response 310-*b* may include RRC signaling. The RRC signaling may include signaling associated with a role-switch operation regarding the designation or assignment of the primary link 235-*c*. For example, the RRC signaling may indicate that the cellular network link 225-*c* is to be designated or assigned as the primary link 235-*c*. Additionally or alternatively, the RRC signaling may include a WLAN modification message (e.g., a message or command indicating one or more elements associated with an attempt to reconnect to the access point 220-*c* or otherwise recover the failed WLAN link 230-*c*) or a new access point identifier (e.g., an access point identifier associated with another access point for the UE 115-*d* to connect to instead of attempting to reconnect to the access point 220-*c*). In some examples, the RRC signaling may be transmitted over the cellular network link 225-*c*.

In some examples, the UE 115-*d* may start a timer, such as a network response timer based on detecting that the WLAN link 230-*c* has failed. For example, the UE 115-*d* may use such a timer to select, measure, determine, compute, or otherwise obtain a time period in which the CU 210-*c* is to respond to the failure report 305-*b*. In some cases, the UE 115-*d* may receive the failure report response 310-*b*. In some such cases, the UE 115-*d* may stop, terminate, or reset the timer, and may perform one or more operations based on the failure report response 310-*b* or a command or indication included therein (e.g., the UE 115-*d* may reassign the primary link 235-*c*, attempt to recover the WLAN link 230-*c* by reconnecting to the access point 220-*c*, attempt to recover the WLAN link 230-*c* by attempting to connect to access point 510, perform another recovery operation, or a combination thereof). However, in some cases (e.g., if the CU 210 fails to respond or transmit the failure report response 310-*b*), the timer may reach a predetermined or configured timer threshold (e.g., configured in the configuration received in the control signaling 240-*c*). In some such cases, the UE 115-*d* may measure, determine, compute, or otherwise obtain an indication that both the WLAN link 230-*c* and the cellular network link 225-*c* have failed. As such, the UE 115-*d* may transmit a radio resource control reestablishment message (e.g., to reestablish communications with the CU 210-*c*) based on (in some examples) the timer expiring or reaching the timer threshold, failing to receive a response to the failure report 305-*b* (e.g., the failure report response 310-*b*), or a combination thereof.

Figure 6:
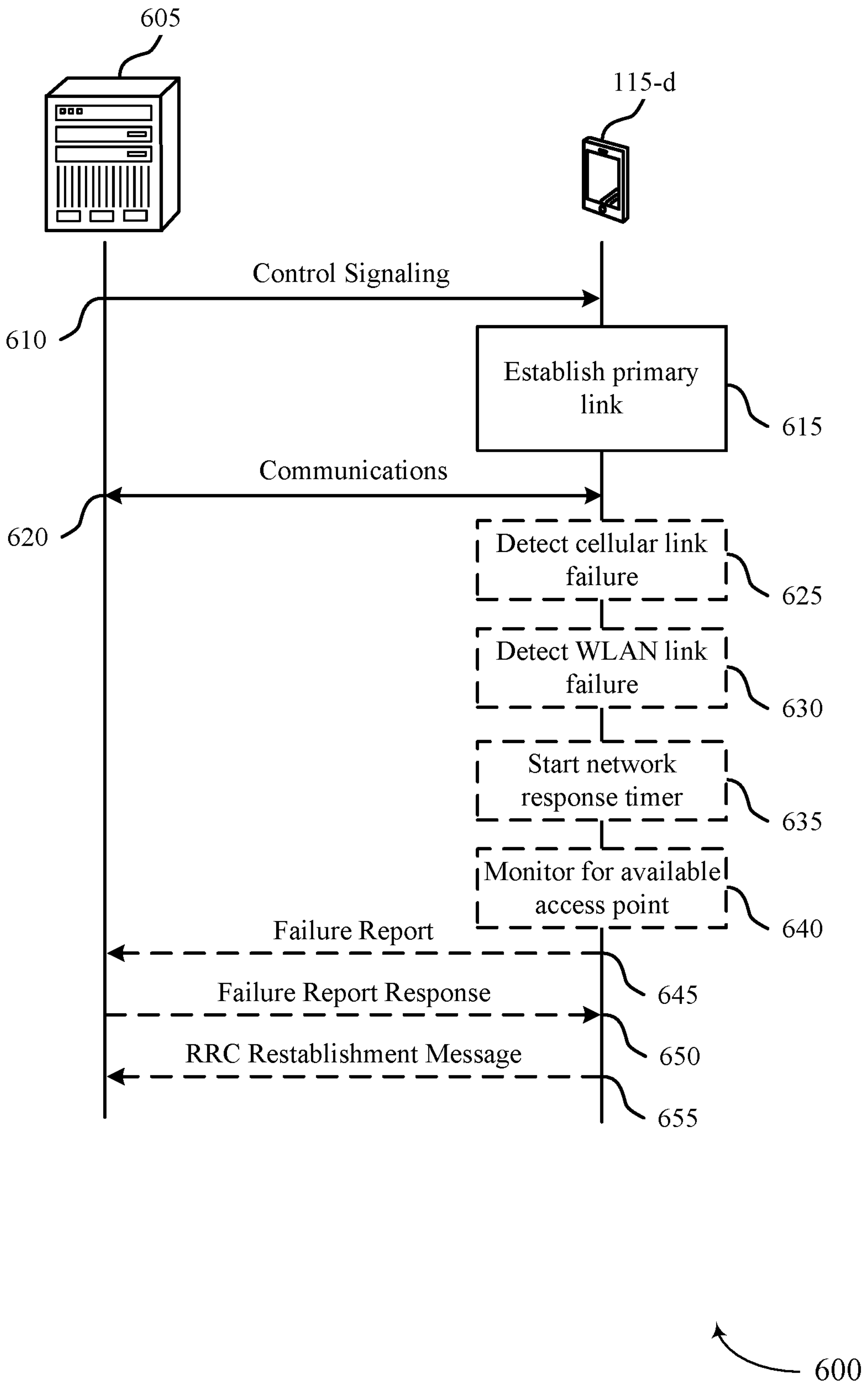
FIG. 6 illustrates an example of a process flow that supports radio resource state and recovery for wireless local area network and cellular network dual connectivity operation in accordance with aspects of the present disclosure.

FIG. 6 illustrates an example of a process flow 600 that supports radio resource state and recovery for wireless local area network and cellular network dual connectivity operation in accordance with aspects of the present disclosure. The process flow 600 may implement various aspects of the present disclosure described with reference to FIGS. 1-5. The process flow 600 may include a network entity 605, and a UE 115-*e*, which may be examples of the CU 210 and the UE 115 as described with reference to FIGS. 1-5. In some examples, the UE 115-*c* may be configured with an RRC state and recovery capability in relation to a dual connectivity connection.

In the following description of the process flow 600, the operations between the network entity 605 and the UE 115-*e* may be performed in different orders or at different times. Some operations may also be left out of the process flow 600, or other operations may be added. Although the network entity 605 and the UE 115-*e* are shown performing the operations of the process flow 600, some aspects of some operations may also be performed by one or more other wireless devices. Additionally or alternatively, other devices may be substituted in place of the network entity 605, the UE 115-*e*, or both. For example, instead of the network entity 605, another device (e.g., a CU, a DU, a gNB, a base station, or other device) could be included in the process flow. Similarly, another device may be substituted in place of the UE 115-*e* (e.g., another DU, another CU, a base station, etc.).

At 610, the UE 115-*d* may receive, from the network entity 605, control signaling indicating a configuration for establishing a dual connectivity connection between the UE 115-*d* and the network entity 605. The dual connectivity connection may include a wireless local area network link and a cellular network link. In some examples, the network entity 605 may determine the single radio resource control state based at least in part on an assessment of both the wireless local area network link and the cellular network link or based at least in part on an assessment of the primary link.

At 615, the UE 115-*d* may establish the wireless local area network link or the cellular network link as a primary link of the dual connectivity connection based on the configuration. The primary link may be reconfigurable between the wireless local area network link and the cellular network link, and the dual connectivity connection may support a single radio resource control connection associated with the primary link between the UE 115-*d* and the network entity 605.

At 620, the UE 115-*d* may communicate, according to a first radio resource control state of a plurality of radio resource control states of the dual connectivity connection. The network entity 605 may use at least the primary link of the dual connectivity connection, and the UE 115-*d* may support a single radio resource control state of the plurality of radio resource control states at a time.

At 625, the UE 115-*d* may detect that the cellular network link of the dual connectivity connection has failed. In some examples, the cellular network link may be established as the primary link and the UE 115-*d* may suspend one or more data radio bearers associated with the cellular network link and one or more signaling radio bearers associated with the cellular network link.

At 630, the wireless local area network link may be established as the primary link and the UE 115-*d* may detect that the wireless local area network link of the dual connectivity connection has failed. In some examples, detecting that the wireless local area network link has failed may include detecting that a number of failed listen-before-talk attempts is greater than or equal to a listen-before-talk threshold, detecting that a reference signal received power associated with an access point is less than or equal to a reference signal received power threshold, or a combination thereof.

Additionally or alternatively, the cellular network link may be established as the primary link and the UE 115-*d* may detect that the wireless local area network link of the dual connectivity connection has failed. In some examples, the UE 115-*d* may suspend one or more data radio bearers associated with the cellular network link. In some examples, detecting that the wireless local area network link has failed further may include detecting that a number of failed listen-before-talk attempts is greater than or equal to a listen-before-talk threshold, detecting that a reference signal received power associated with an access point is less than or equal to a reference signal received power threshold, or a combination thereof.

At 635, the UE 115-*d* may start a network response timer based on detecting that the cellular network link has failed. Additionally or alternatively, the UE 115-*d* may start a network response timer based on detecting that the wireless local area network link has failed.

At 640, the UE 115-*d* may monitor for an available wireless local area network access point. In some examples, the UE 115-*d* may associate with the available wireless local area network access point. In some examples, the UE 115-*d* may fail to associate with the available wireless local area network access point.

At 645, the UE 115-*d* may transmit, to the network entity 605, a report indicating the failure of the cellular network link using the wireless local area network link via a split signaling radio bearer, the report encapsulated in an internet protocol packet for delivery over the wireless local area network link. In some examples, transmitting the report may include transmitting one or more measurements associated with the dual connectivity connection, a failure type associated with the failure of the cellular network link, a failure cause associated with the failure of the cellular network link, or a combination thereof.

Additionally or alternatively, the UE 115-*d* may transmit, to the network entity 605 via a split signaling radio bearer over the cellular network link, a report indicating the failure of the wireless local area network link. In some examples, the UE 115-*d* may suspend one or more data radio bearers associated with the cellular network link. In some examples, transmitting the report may include transmitting one or more measurements associated with the dual connectivity connection, a failure type associated with the failure of the wireless local area network link, a failure cause associated with the failure of the wireless local area network link, or a combination thereof.

Additionally or alternatively, the UE 115-*d* may transmit, to the network entity 605 via a split signaling radio bearer, a report indicating the failure of the wireless local area network link, the report comprising information associated with the failure of the wireless local area network link. In some examples, transmitting the report may be based on associating with the available access point and information associated with the failure of the wireless local area network link may include information associated with the associated available wireless local area network access point. In some examples, the information associated with the associated available wireless local area network access point may include an identifier of the associated available wireless local area network access point. In some examples, transmitting the report may include transmitting the report over the cellular network link. In some examples, the information associated with the failure of the wireless local area network link may include one or more measurements associated with the dual connectivity connection, a failure type associated with the failure of the wireless local area network link, a failure cause associated with the failure of the wireless local area network link, or a combination thereof.

At 650, the UE 115-*d* may monitor for a response from the network entity 605. In some examples, the response to the report from the network entity 605 may include a hand-off command or an indication designating the wireless local area network link as the primary link. In some examples, the response to the report may be encapsulated in a unicast internet protocol packet received over the wireless local area network link. In some examples, the response to the report may include an indication designating the cellular network link as the primary link, a wireless local area network modification message, one or more wireless local area network access point identifiers, or a combination thereof. In some examples, the response to the report may include a wireless local area network modification message, one or more wireless local area network access point identifiers, or a combination thereof.

At 655, the UE 115-*d* may transmit a radio resource control reestablishment message based on the network response timer expiring and failing to receive a response to the report from the network entity 605.

Figure 7:
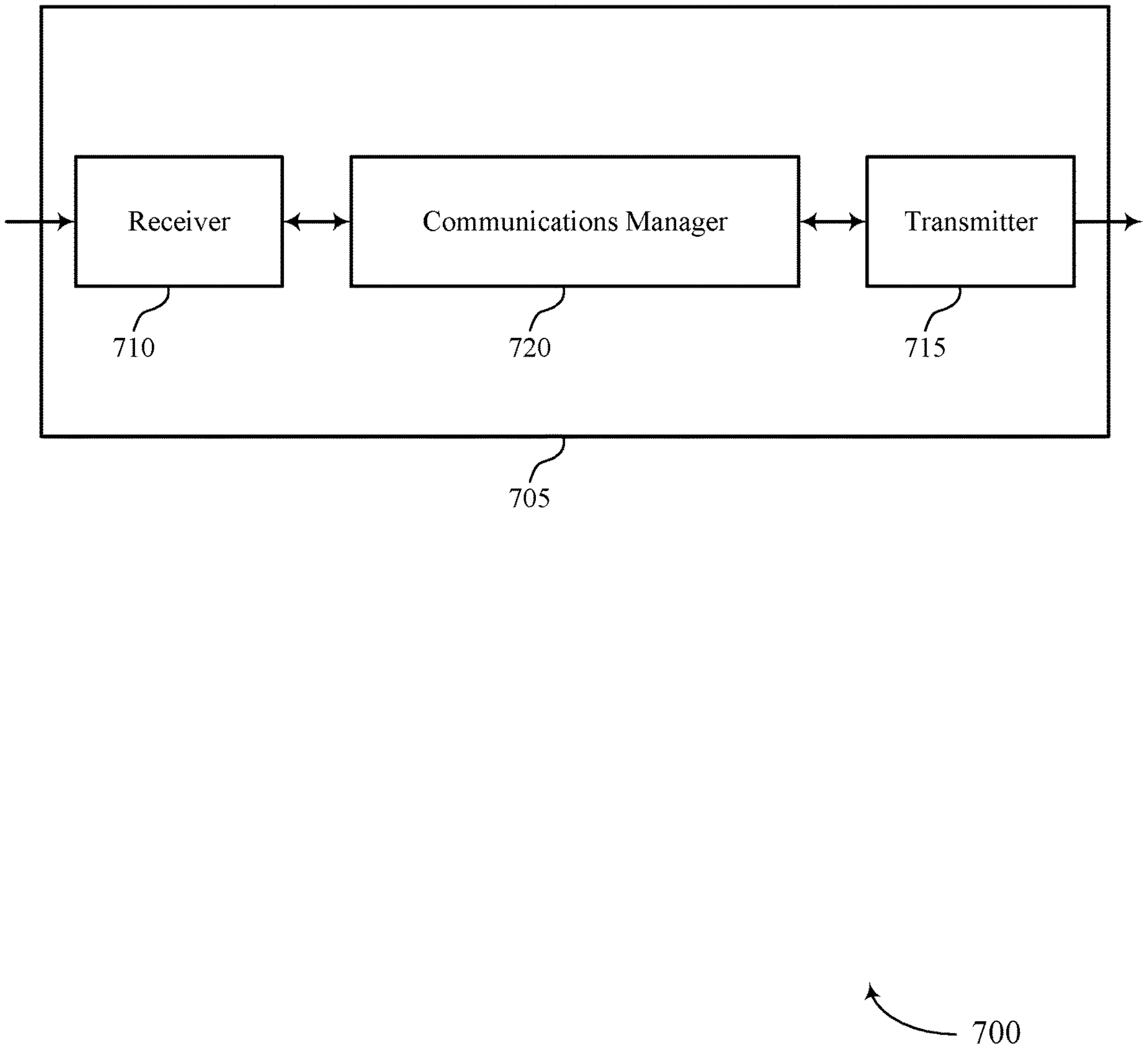
FIGS. 7 and 8 show block diagrams of devices that support radio resource state and recovery for wireless local area network and cellular network dual connectivity operation in accordance with aspects of the present disclosure.

FIG. 7 shows a block diagram 700 of a device 705 that supports radio resource state and recovery for wireless local area network and cellular network dual connectivity operation in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to radio resource state and recovery for wireless local area network and cellular network dual connectivity operation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to radio resource state and recovery for wireless local area network and cellular network dual connectivity operation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of radio resource state and recovery for wireless local area network and cellular network dual connectivity operation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving, from a network entity, control signaling indicating a configuration for establishing a dual connectivity connection between the UE and the network entity, where the dual connectivity connection includes a wireless local area network link and a cellular network link. The communications manager 720 may be configured as or otherwise support a means for establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The communications manager 720 may be configured as or otherwise support a means for communicating, according to a first radio resource control state of a set of multiple radio resource control states of the dual connectivity connection, with the network entity using at least the primary link of the dual connectivity connection, where the UE supports a single radio resource control state of the set of multiple radio resource control states at a time.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, more efficient utilization of communication resources, or a combination thereof.

Figure 8:
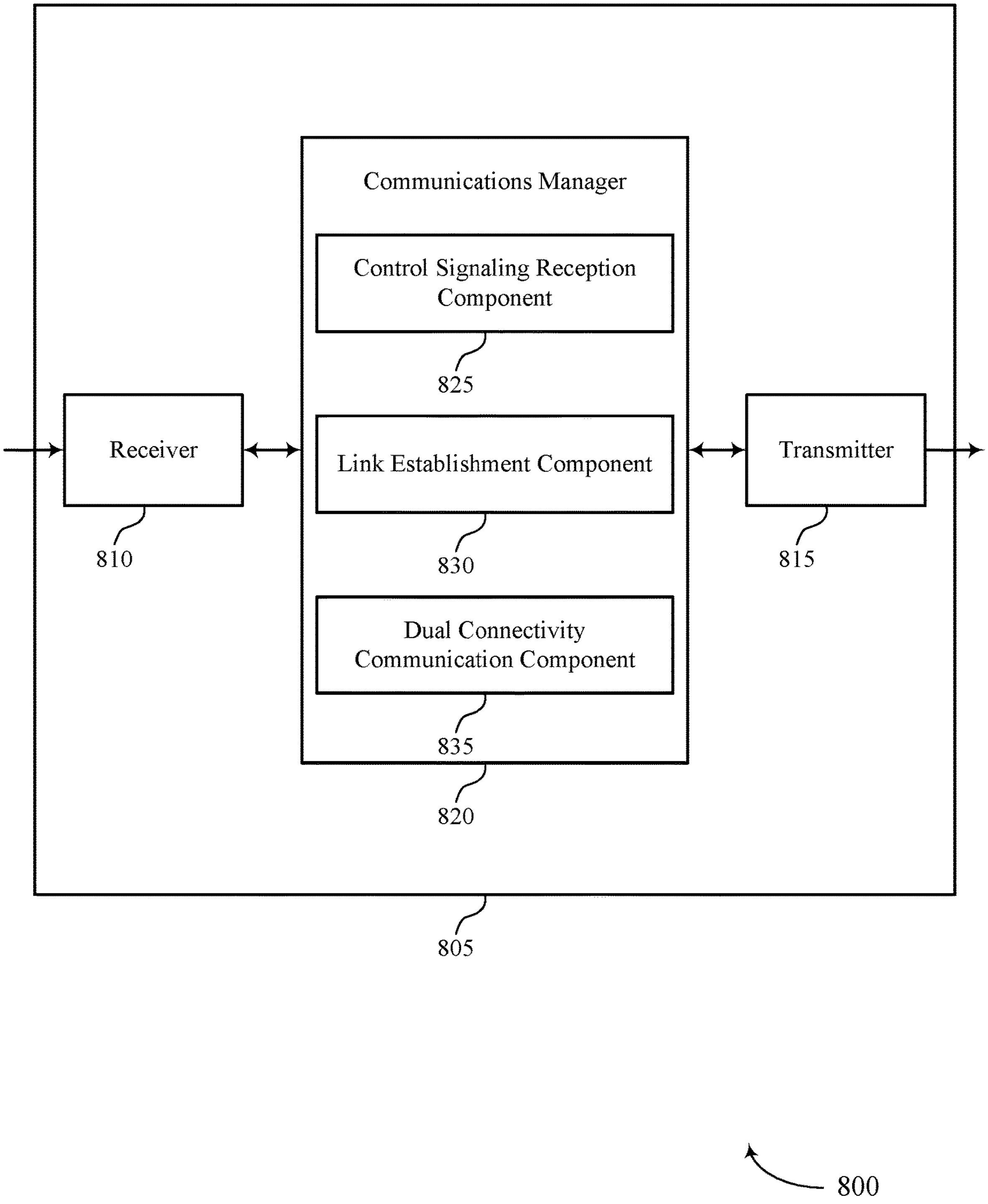

FIG. 8 shows a block diagram 800 of a device 805 that supports radio resource state and recovery for wireless local area network and cellular network dual connectivity operation in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to radio resource state and recovery for wireless local area network and cellular network dual connectivity operation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to radio resource state and recovery for wireless local area network and cellular network dual connectivity operation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of radio resource state and recovery for wireless local area network and cellular network dual connectivity operation as described herein. For example, the communications manager 820 may include a control signaling reception component 825, a link establishment component 830, a dual connectivity communication component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The control signaling reception component 825 may be configured as or otherwise support a means for receiving, from a network entity, control signaling indicating a configuration for establishing a dual connectivity connection between the UE and the network entity, where the dual connectivity connection includes a wireless local area network link and a cellular network link. The link establishment component 830 may be configured as or otherwise support a means for establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The dual connectivity communication component 835 may be configured as or otherwise support a means for communicating, according to a first radio resource control state of a set of multiple radio resource control states of the dual connectivity connection, with the network entity using at least the primary link of the dual connectivity connection, where the UE supports a single radio resource control state of the set of multiple radio resource control states at a time.

Figure 9:
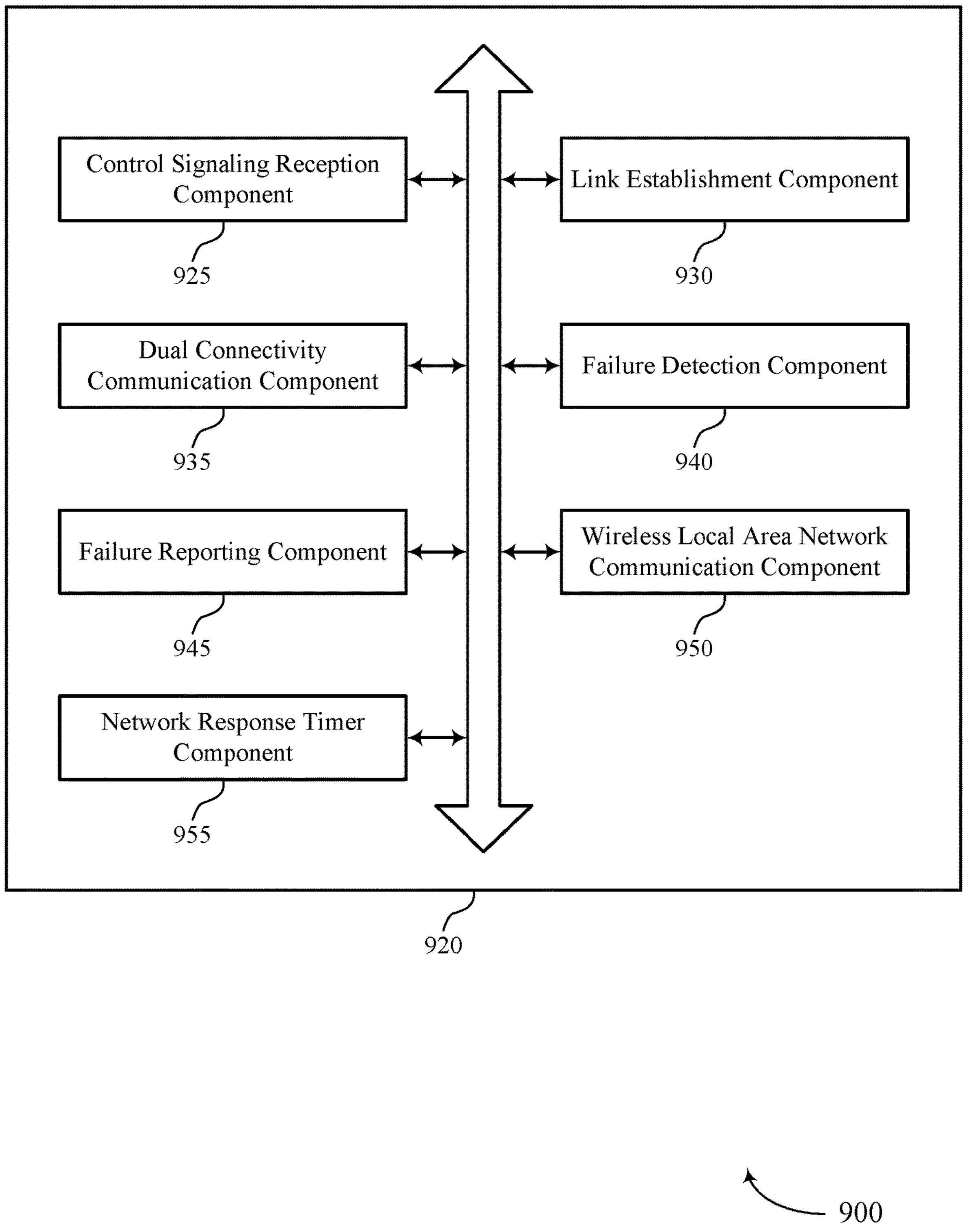
FIG. 9 shows a block diagram of a communications manager that supports radio resource state and recovery for wireless local area network and cellular network dual connectivity operation in accordance with aspects of the present disclosure.

FIG. 9 shows a block diagram 900 of a communications manager 920 that supports radio resource state and recovery for wireless local area network and cellular network dual connectivity operation in accordance with aspects of the present disclosure. The communications manager 920 may be an example of aspects of a communications manager 720, a communications manager 820, or both, as described herein. The communications manager 920, or various components thereof, may be an example of means for performing various aspects of radio resource state and recovery for wireless local area network and cellular network dual connectivity operation as described herein. For example, the communications manager 920 may include a control signaling reception component 925, a link establishment component 930, a dual connectivity communication component 935, a failure detection component 940, a failure reporting component 945, a wireless local area network communication component 950, a network response timer component 955, or any combination thereof. Each of these components may communicate, directly or indirectly, with one another (e.g., via one or more buses).

The communications manager 920 may support wireless communications at a UE in accordance with examples as disclosed herein. The control signaling reception component 925 may be configured as or otherwise support a means for receiving, from a network entity, control signaling indicating a configuration for establishing a dual connectivity connection between the UE and the network entity, where the dual connectivity connection includes a wireless local area network link and a cellular network link. The link establishment component 930 may be configured as or otherwise support a means for establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The dual connectivity communication component 935 may be configured as or otherwise support a means for communicating, according to a first radio resource control state of a set of multiple radio resource control states of the dual connectivity connection, with the network entity using at least the primary link of the dual connectivity connection, where the UE supports a single radio resource control state of the set of multiple radio resource control states at a time.

In some examples, the failure detection component 940 may be configured as or otherwise support a means for detecting that the cellular network link of the dual connectivity connection has failed. In some examples, the failure reporting component 945 may be configured as or otherwise support a means for transmitting, to the network entity, a report indicating the failure of the cellular network link using the wireless local area network link via a split signaling radio bearer, the report encapsulated in an internet protocol packet for delivery over the wireless local area network link. In some examples, the dual connectivity communication component 935 may be configured as or otherwise support a means for monitoring for a response to the report from the network entity.

In some examples, the network response timer component 955 may be configured as or otherwise support a means for starting a network response timer based on detecting that the cellular network link has failed. In some examples, the link establishment component 930 may be configured as or otherwise support a means for transmitting a radio resource control reestablishment message based on the network response timer expiring and failing to receive a response to the report from the network entity.

In some examples, the cellular network link is established as the primary link, and the dual connectivity communication component 935 may be configured as or otherwise support a means for suspending one or more data radio bearers associated with the cellular network link and one or more signaling radio bearers associated with the cellular network link.

In some examples, the response to the report from the network entity includes a hand-off command or an indication designating the wireless local area network link as the primary link. In some examples, the response to the report is encapsulated in a unicast internet protocol packet received over the wireless local area network link.

In some examples, transmitting the report includes transmitting one or more measurements associated with the dual connectivity connection, a failure type associated with the failure of the cellular network link, a failure cause associated with the failure of the cellular network link, or a combination thereof.

In some examples, the wireless local area network link is established as the primary link, and the failure detection component 940 may be configured as or otherwise support a means for detecting that the wireless local area network link of the dual connectivity connection has failed. In some examples, the wireless local area network link is established as the primary link, and the failure reporting component 945 may be configured as or otherwise support a means for transmitting, to the network entity via a split signaling radio bearer over the cellular network link, a report indicating the failure of the wireless local area network link. In some examples, the wireless local area network link is established as the primary link, and the dual connectivity communication component 935 may be configured as or otherwise support a means for monitoring for a response to the report from the network entity.

In some examples, the network response timer component 955 may be configured as or otherwise support a means for starting a network response timer based on detecting that the wireless local area network link has failed. In some examples, the link establishment component 930 may be configured as or otherwise support a means for transmitting a radio resource control reestablishment message based on the network response timer expiring and failing to receive a response to the report from the network entity.

In some examples, the dual connectivity communication component 935 may be configured as or otherwise support a means for suspending one or more data radio bearers associated with the cellular network link.

In some examples, transmitting the report includes transmitting one or more measurements associated with the dual connectivity connection, a failure type associated with the failure of the wireless local area network link, a failure cause associated with the failure of the wireless local area network link, or a combination thereof.

In some examples, to support detecting that the wireless local area network link has failed, the failure detection component 940 may be configured as or otherwise support a means for detecting that a number of failed listen-before-talk attempts is greater than or equal to a listen-before-talk threshold, detecting that a reference signal received power associated with an access point is less than or equal to a reference signal received power threshold, or a combination thereof.

In some examples, the response to the report includes an indication designating the cellular network link as the primary link, a wireless local area network modification message, one or more wireless local area network access point identifiers, or a combination thereof.

In some examples, the cellular network link is established as the primary link, and the failure detection component 940 may be configured as or otherwise support a means for detecting that the wireless local area network link of the dual connectivity connection has failed. In some examples, the cellular network link is established as the primary link, and the wireless local area network communication component 950 may be configured as or otherwise support a means for monitoring for an available wireless local area network access point. In some examples, the cellular network link is established as the primary link, and the failure reporting component 945 may be configured as or otherwise support a means for transmitting, to the network entity via a split signaling radio bearer, a report indicating the failure of the wireless local area network link, the report including information associated with the failure of the wireless local area network link. In some examples, the cellular network link is established as the primary link, and the dual connectivity communication component 935 may be configured as or otherwise support a means for monitoring for a response to the report from the network entity.

In some examples, the wireless local area network communication component 950 may be configured as or otherwise support a means for associating with the available wireless local area network access point, where transmitting the report is based on the associating. In some examples, the failure reporting component 945 may be configured as or otherwise support a means for where the information associated with the failure of the wireless local area network link includes information associated with the associated available wireless local area network access point.

In some examples, the information associated with the associated available wireless local area network access point includes an identifier of the associated available wireless local area network access point.

In some examples, the wireless local area network communication component 950 may be configured as or otherwise support a means for failing to associate with the available wireless local area network access point. In some examples, the failure reporting component 945 may be configured as or otherwise support a means for where transmitting the report includes transmitting the report over the cellular network link.

In some examples, the network response timer component 955 may be configured as or otherwise support a means for starting a network response timer based on detecting that the wireless local area network connection has failed. In some examples, the link establishment component 930 may be configured as or otherwise support a means for transmitting a radio resource control reestablishment message based on the network response timer expiring and failing to receive a response to the report from the network entity.

In some examples, the dual connectivity communication component 935 may be configured as or otherwise support a means for suspending one or more data radio bearers associated with the cellular network link.

In some examples, the information associated with the failure of the wireless local area network link includes one or more measurements associated with the dual connectivity connection, a failure type associated with the failure of the wireless local area network link, a failure cause associated with the failure of the wireless local area network link, or a combination thereof.

In some examples, the failure detection component 940 may be configured as or otherwise support a means for detecting that the wireless local area network link has failed further includes detecting that a number of failed listen-before-talk attempts is greater than or equal to a listen-before-talk threshold, detecting that a reference signal received power associated with an access point is less than or equal to a reference signal received power threshold, or a combination thereof.

In some examples, the response to the report includes a wireless local area network modification message, one or more wireless local area network access point identifiers, or a combination thereof.

Figure 10:
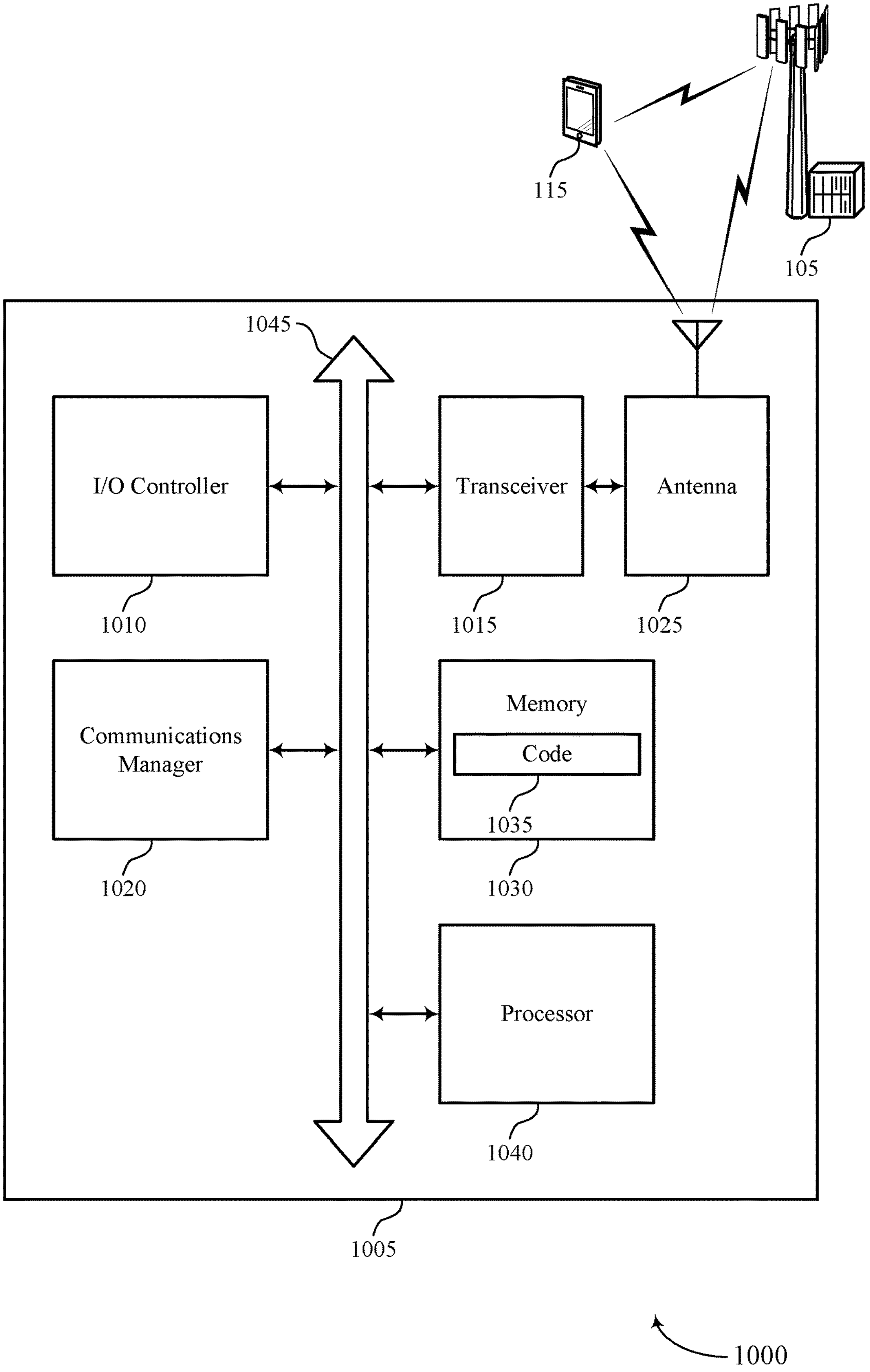
FIG. 10 shows a diagram of a system including a device that supports radio resource state and recovery for wireless local area network and cellular network dual connectivity operation in accordance with aspects of the present disclosure.

FIG. 10 shows a diagram of a system 1000 including a device 1005 that supports radio resource state and recovery for wireless local area network and cellular network dual connectivity operation in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting radio resource state and recovery for wireless local area network and cellular network dual connectivity operation). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, from a network entity, control signaling indicating a configuration for establishing a dual connectivity connection between the UE and the network entity, where the dual connectivity connection includes a wireless local area network link and a cellular network link. The communications manager 1020 may be configured as or otherwise support a means for establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The communications manager 1020 may be configured as or otherwise support a means for communicating, according to a first radio resource control state of a set of multiple radio resource control states of the dual connectivity connection, with the network entity using at least the primary link of the dual connectivity connection, where the UE supports a single radio resource control state of the set of multiple radio resource control states at a time.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of radio resource state and recovery for wireless local area network and cellular network dual connectivity operation as described herein, or the processor 1040 and the memory 1030 may be otherwise configured to perform or support such operations.

Figure 11:
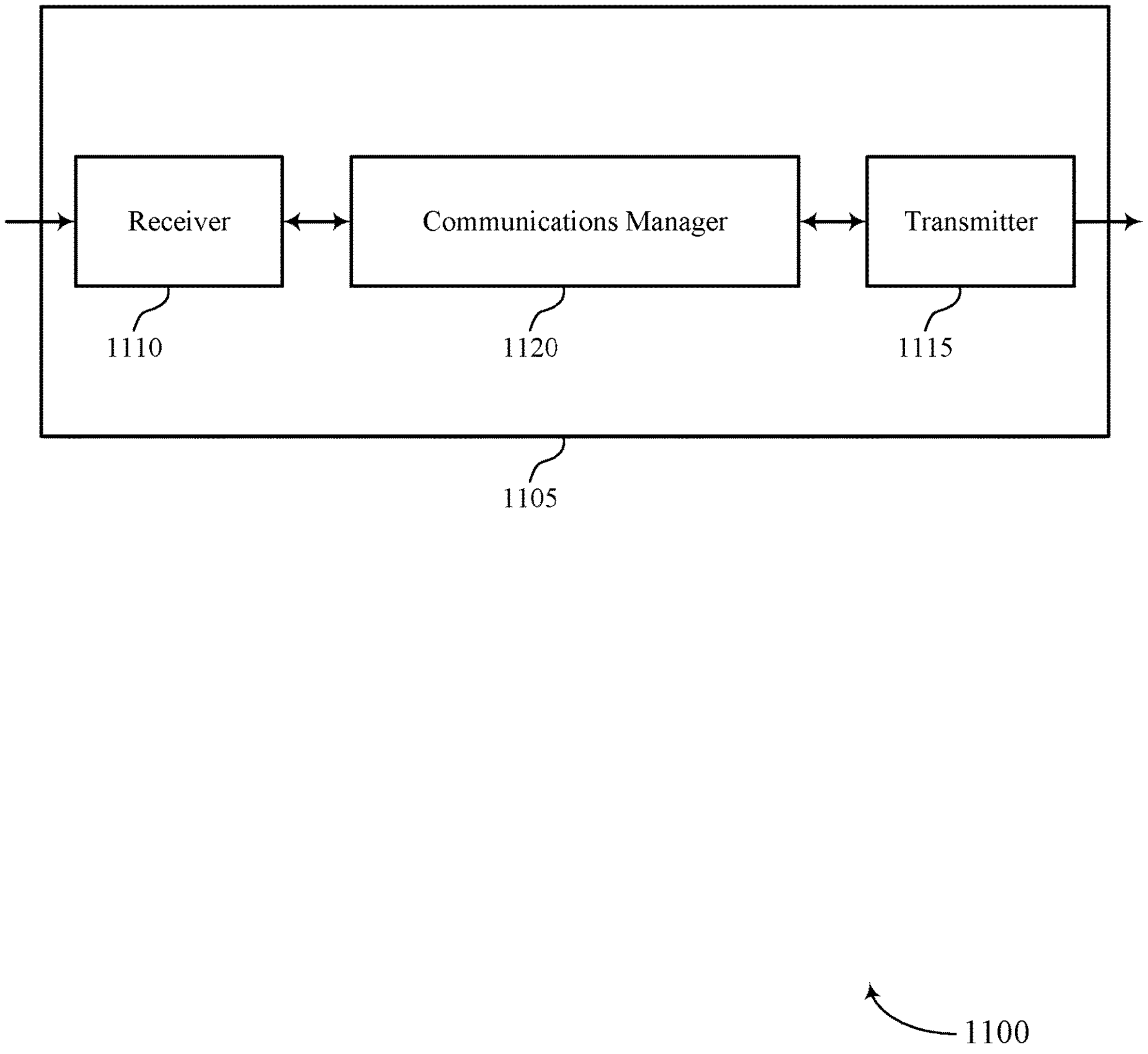
FIGS. 11 and 12 show block diagrams of devices that support radio resource state and recovery for wireless local area network and cellular network dual connectivity operation in accordance with aspects of the present disclosure.

FIG. 11 shows a block diagram 1100 of a device 1105 that supports radio resource state and recovery for wireless local area network and cellular network dual connectivity operation in accordance with aspects of the present disclosure. The device 1105 may be an example of aspects of a Network Entity as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to radio resource state and recovery for wireless local area network and cellular network dual connectivity operation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to radio resource state and recovery for wireless local area network and cellular network dual connectivity operation). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of radio resource state and recovery for wireless local area network and cellular network dual connectivity operation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a network entity in accordance with examples as disclosed herein. For example, the communications manager 1120 may be configured as or otherwise support a means for transmitting, to a UE, control signaling indicating a configuration for establishing a dual connectivity connection between the UE and the network entity, where the dual connectivity connection includes a wireless local area network link and a cellular network link. The communications manager 1120 may be configured as or otherwise support a means for establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The communications manager 1120 may be configured as or otherwise support a means for communicating, according to a first radio resource control state of a set of multiple radio resource control states of the dual connectivity connection, with the UE using at least the primary link of the dual connectivity connection, where the UE supports a single radio resource control state of the set of multiple radio resource control states at a time.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, more efficient utilization of communication resources, or a combination thereof.

Figure 12:
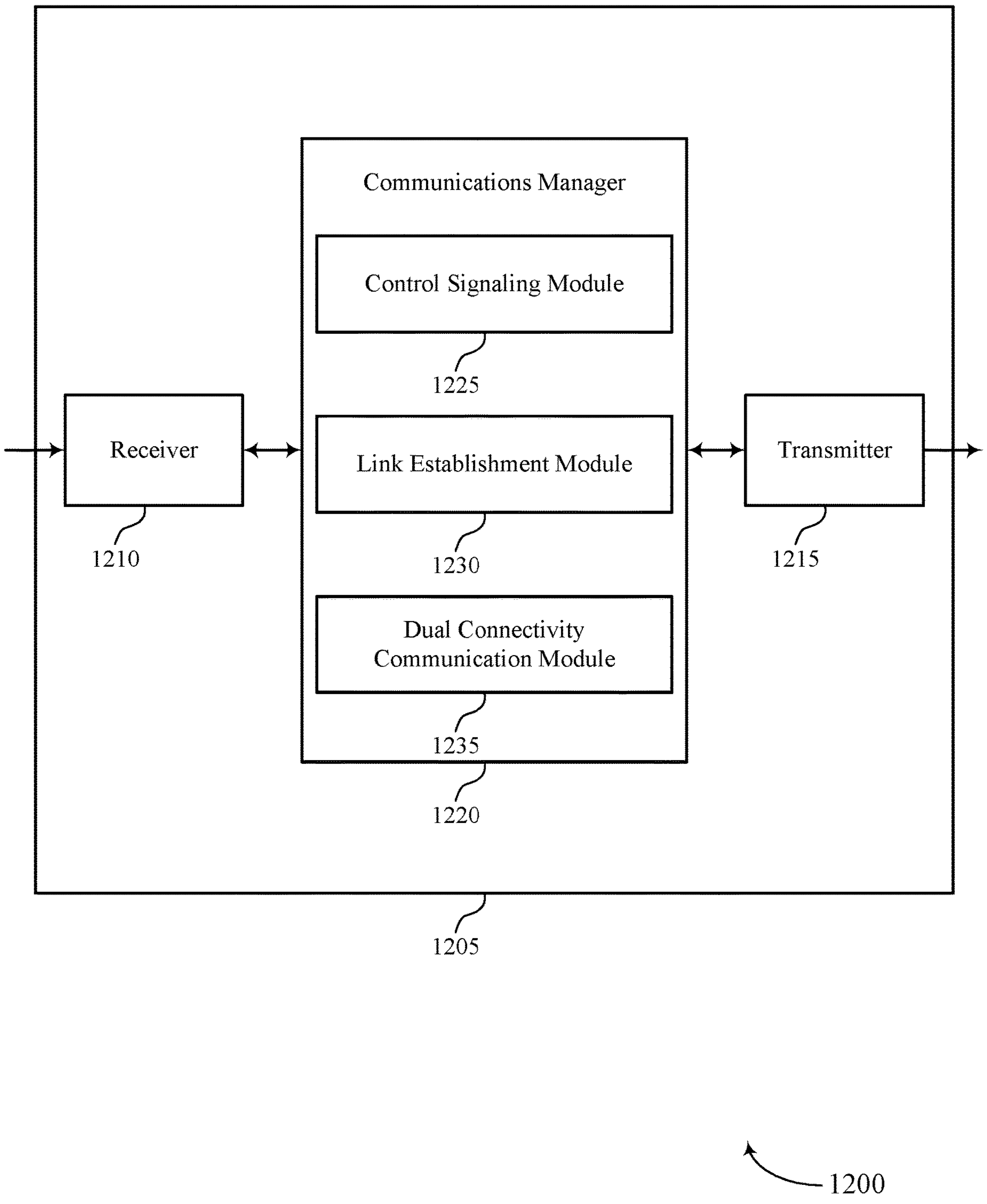

FIG. 12 shows a block diagram 1200 of a device 1205 that supports radio resource state and recovery for wireless local area network and cellular network dual connectivity operation in accordance with aspects of the present disclosure. The device 1205 may be an example of aspects of a device 1105 or a Network Entity as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to radio resource state and recovery for wireless local area network and cellular network dual connectivity operation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to radio resource state and recovery for wireless local area network and cellular network dual connectivity operation). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of radio resource state and recovery for wireless local area network and cellular network dual connectivity operation as described herein. For example, the communications manager 1220 may include a control signaling module 1225, a link establishment module 1230, a dual connectivity communication module 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a network entity in accordance with examples as disclosed herein. The control signaling module 1225 may be configured as or otherwise support a means for transmitting, to a UE, control signaling indicating a configuration for establishing a dual connectivity connection between the UE and the network entity, where the dual connectivity connection includes a wireless local area network link and a cellular network link. The link establishment module 1230 may be configured as or otherwise support a means for establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The dual connectivity communication module 1235 may be configured as or otherwise support a means for communicating, according to a first radio resource control state of a set of multiple radio resource control states of the dual connectivity connection, with the UE using at least the primary link of the dual connectivity connection, where the UE supports a single radio resource control state of the set of multiple radio resource control states at a time.

Figure 13:
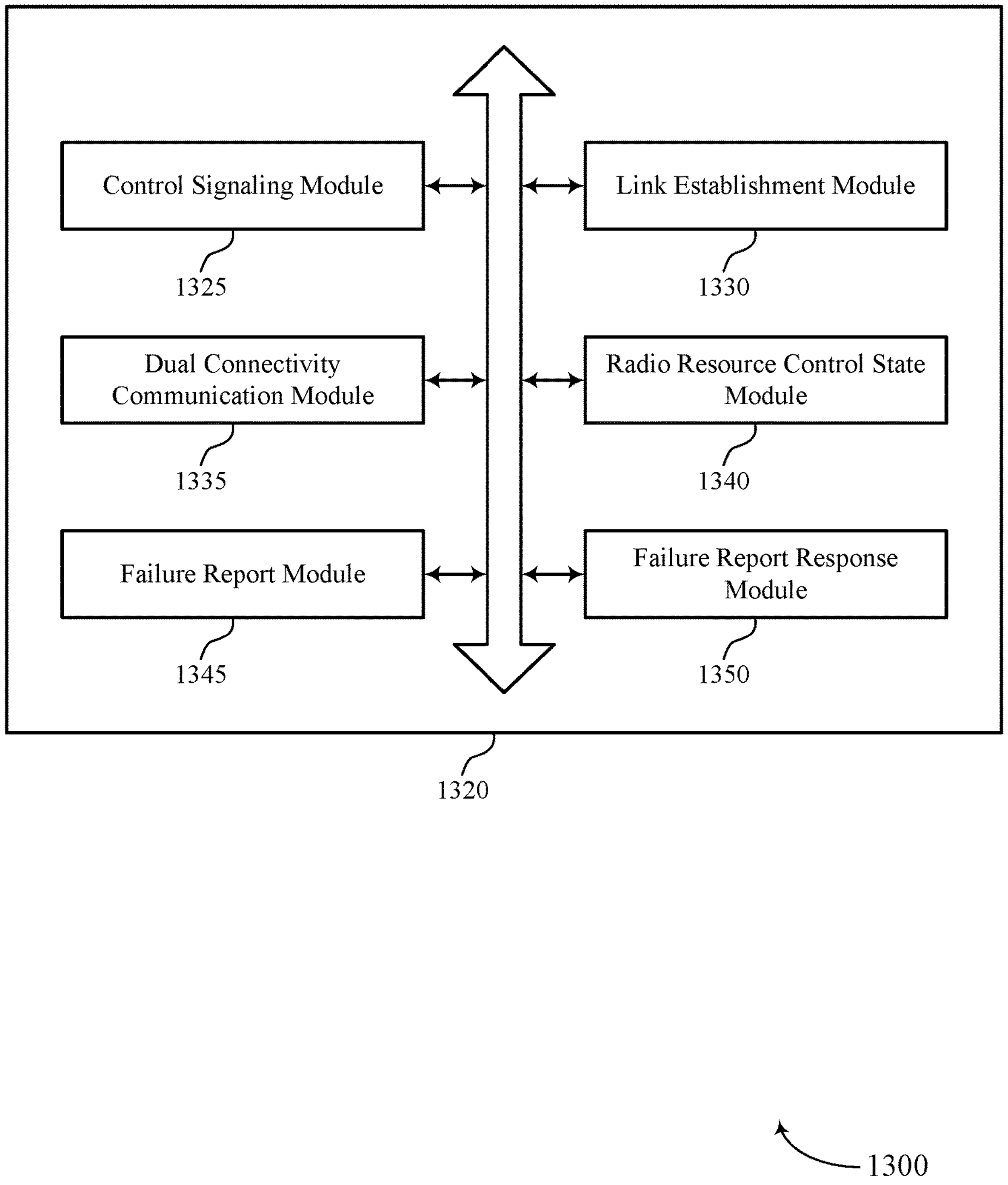
FIG. 13 shows a block diagram of a communications manager that supports radio resource state and recovery for wireless local area network and cellular network dual connectivity operation in accordance with aspects of the present disclosure.

FIG. 13 shows a block diagram 1300 of a communications manager 1320 that supports radio resource state and recovery for wireless local area network and cellular network dual connectivity operation in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of radio resource state and recovery for wireless local area network and cellular network dual connectivity operation as described herein. For example, the communications manager 1320 may include a control signaling module 1325, a link establishment module 1330, a dual connectivity communication module 1335, a radio resource control state module 1340, a failure report module 1345, a failure report response module 1350, or any combination thereof. Each of these components may communicate, directly or indirectly, with one another (e.g., via one or more buses).

The communications manager 1320 may support wireless communications at a network entity in accordance with examples as disclosed herein. The control signaling module 1325 may be configured as or otherwise support a means for transmitting, to a UE, control signaling indicating a configuration for establishing a dual connectivity connection between the UE and the network entity, where the dual connectivity connection includes a wireless local area network link and a cellular network link. The link establishment module 1330 may be configured as or otherwise support a means for establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The dual connectivity communication module 1335 may be configured as or otherwise support a means for communicating, according to a first radio resource control state of a set of multiple radio resource control states of the dual connectivity connection, with the UE using at least the primary link of the dual connectivity connection, where the UE supports a single radio resource control state of the set of multiple radio resource control states at a time.

In some examples, the radio resource control state module 1340 may be configured as or otherwise support a means for determining the single radio resource control state based on an assessment of both the wireless local area network link and the cellular network link or based on an assessment of the primary link.

In some examples, the failure report module 1345 may be configured as or otherwise support a means for receiving, from the UE, a report indicating the failure of the cellular network link using the wireless local area network link via a split signaling radio bearer, the report encapsulated in an internet protocol packet for delivery over the wireless local area network link. In some examples, the failure report response module 1350 may be configured as or otherwise support a means for transmitting, to the UE, a response to the report.

In some examples, the wireless local area network link is established as the primary link, and the failure report module 1345 may be configured as or otherwise support a means for receiving, from the UE via a split signaling radio bearer over the cellular network link, a report indicating the failure of the wireless local area network link. In some examples, the wireless local area network link is established as the primary link, and the failure report response module 1350 may be configured as or otherwise support a means for transmitting, to the UE, a response to the report.

In some examples, the cellular network link is established as the primary link, and the failure report module 1345 may be configured as or otherwise support a means for receiving, from the UE via a split signaling radio bearer, a report indicating the failure of the wireless local area network link, the report including information associated with the failure of the wireless local area network link. In some examples, the cellular network link is established as the primary link, and the failure report response module 1350 may be configured as or otherwise support a means for transmitting, to the UE, a response to the report.

Figure 14:
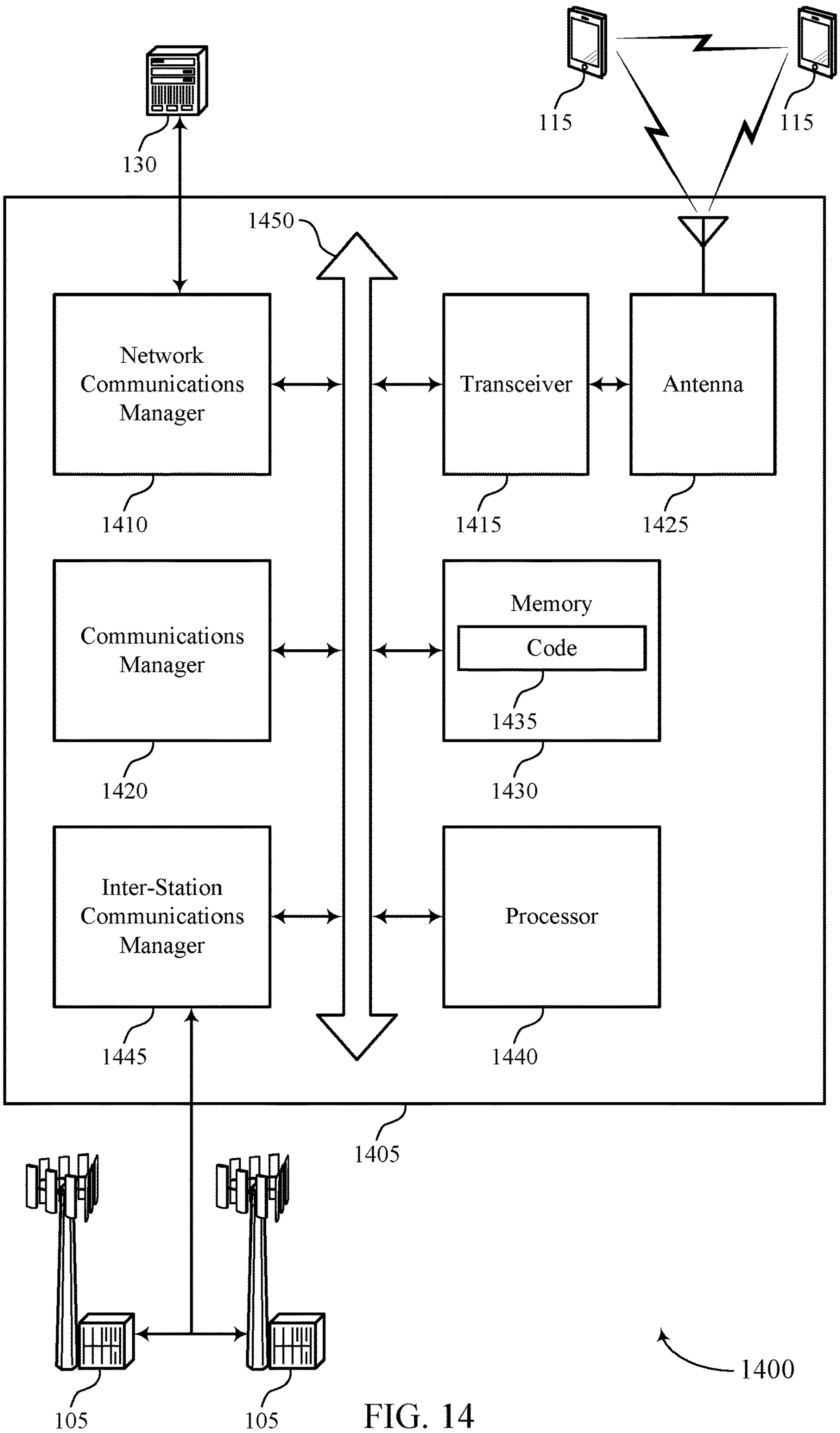
FIG. 14 shows a diagram of a system including a device that supports radio resource state and recovery for wireless local area network and cellular network dual connectivity operation in accordance with aspects of the present disclosure.

FIG. 14 shows a diagram of a system 1400 including a device 1405 that supports radio resource state and recovery for wireless local area network and cellular network dual connectivity operation in accordance with aspects of the present disclosure. The device 1405 may be an example of or include the components of a device 1105, a device 1205, or a Network Entity as described herein. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting radio resource state and recovery for wireless local area network and cellular network dual connectivity operation). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a network entity in accordance with examples as disclosed herein. For example, the communications manager 1420 may be configured as or otherwise support a means for transmitting, to a UE, control signaling indicating a configuration for establishing a dual connectivity connection between the UE and the network entity, where the dual connectivity connection includes a wireless local area network link and a cellular network link. The communications manager 1420 may be configured as or otherwise support a means for establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The communications manager 1420 may be configured as or otherwise support a means for communicating, according to a first radio resource control state of a set of multiple radio resource control states of the dual connectivity connection, with the UE using at least the primary link of the dual connectivity connection, where the UE supports a single radio resource control state of the set of multiple radio resource control states at a time.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of radio resource state and recovery for wireless local area network and cellular network dual connectivity operation as described herein, or the processor 1440 and the memory 1430 may be otherwise configured to perform or support such operations.

Figure 15:
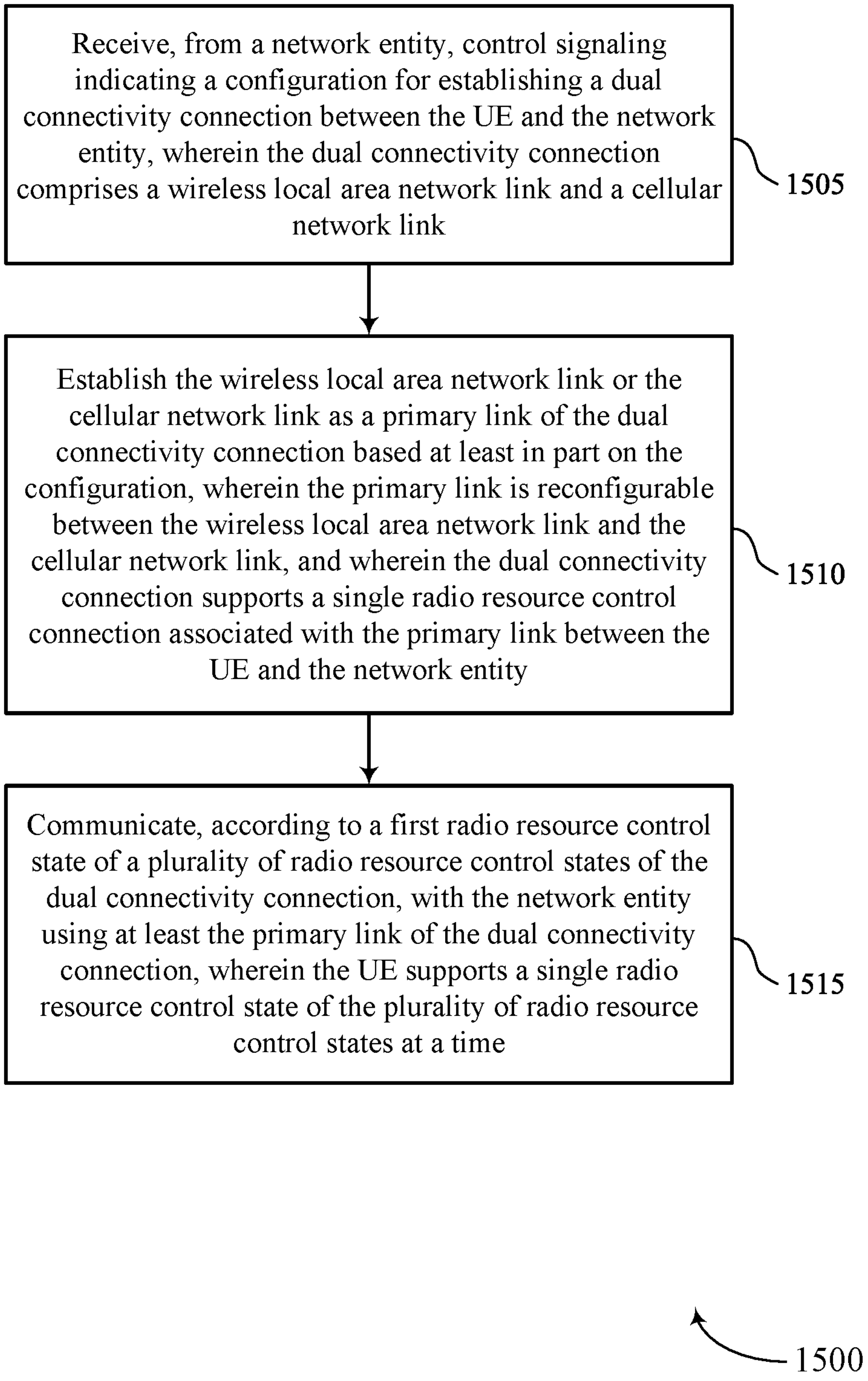
FIGS. 15 through 19 show flowcharts illustrating methods that support radio resource state and recovery for wireless local area network and cellular network dual connectivity operation in accordance with aspects of the present disclosure.

FIG. 15 shows a flowchart illustrating a method 1500 that supports radio resource state and recovery for wireless local area network and cellular network dual connectivity operation in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a network entity, control signaling indicating a configuration for establishing a dual connectivity connection between the UE and the network entity, where the dual connectivity connection includes a wireless local area network link and a cellular network link. The operations of 1505 may be performed in accordance with examples as disclosed herein. In some examples, aspects of the operations of 1505 may be performed by a control signaling reception component 925 as described with reference to FIG. 9.

At 1510, the method may include establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The operations of 1510 may be performed in accordance with examples as disclosed herein. In some examples, aspects of the operations of 1510 may be performed by a link establishment component 930 as described with reference to FIG. 9.

At 1515, the method may include communicating, according to a first radio resource control state of a set of multiple radio resource control states of the dual connectivity connection, with the network entity using at least the primary link of the dual connectivity connection, where the UE supports a single radio resource control state of the set of multiple radio resource control states at a time. The operations of 1515 may be performed in accordance with examples as disclosed herein. In some examples, aspects of the operations of 1515 may be performed by a dual connectivity communication component 935 as described with reference to FIG. 9.

Figure 16:
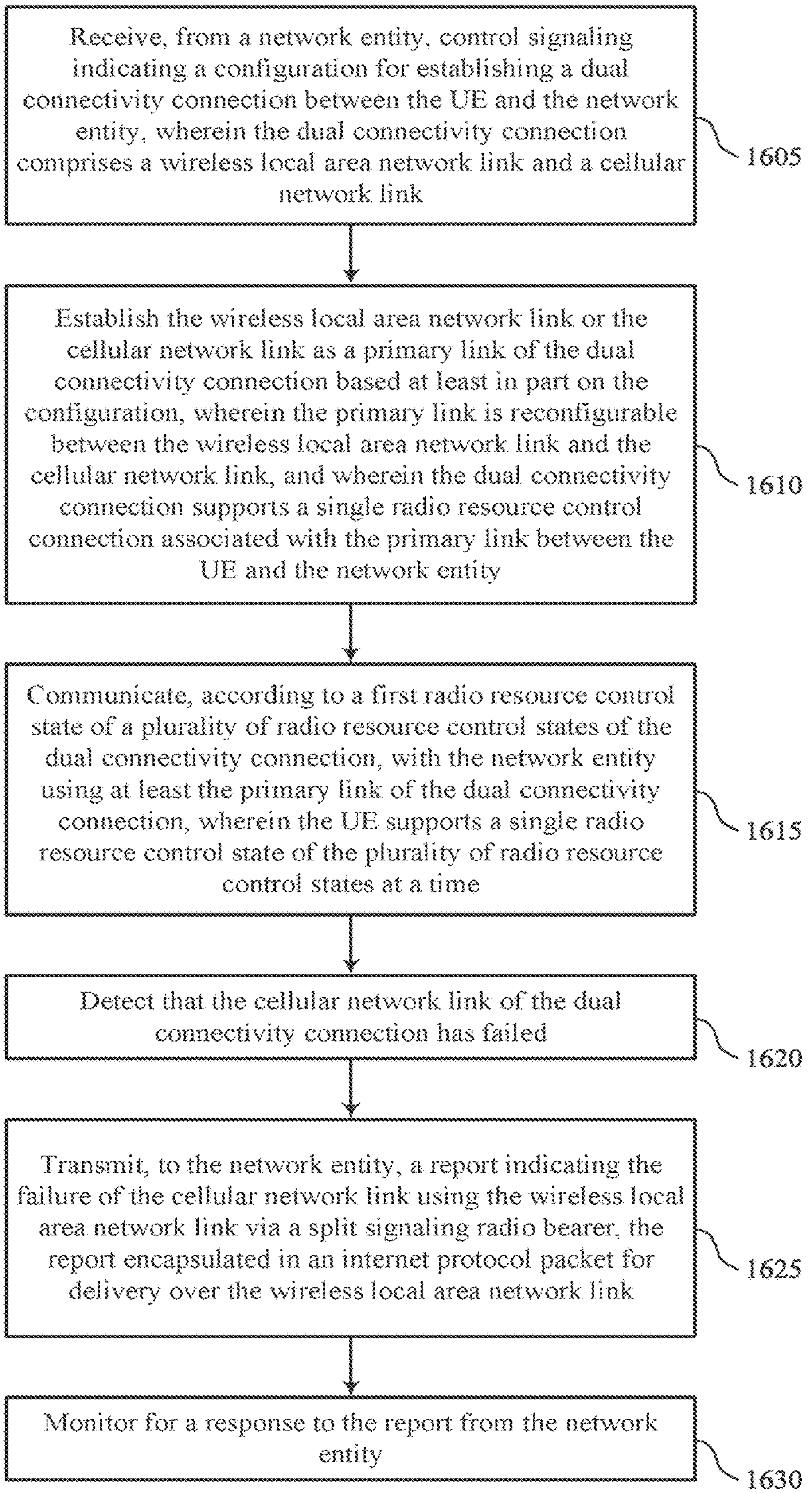

FIG. 16 shows a flowchart illustrating a method 1600 that supports radio resource state and recovery for wireless local area network and cellular network dual connectivity operation in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a network entity, control signaling indicating a configuration for establishing a dual connectivity connection between the UE and the network entity, where the dual connectivity connection includes a wireless local area network link and a cellular network link. The operations of 1605 may be performed in accordance with examples as disclosed herein. In some examples, aspects of the operations of 1605 may be performed by a control signaling reception component 925 as described with reference to FIG. 9.

At 1610, the method may include establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The operations of 1610 may be performed in accordance with examples as disclosed herein. In some examples, aspects of the operations of 1610 may be performed by a link establishment component 930 as described with reference to FIG. 9.

At 1615, the method may include communicating, according to a first radio resource control state of a set of multiple radio resource control states of the dual connectivity connection, with the network entity using at least the primary link of the dual connectivity connection, where the UE supports a single radio resource control state of the set of multiple radio resource control states at a time. The operations of 1615 may be performed in accordance with examples as disclosed herein. In some examples, aspects of the operations of 1615 may be performed by a dual connectivity communication component 935 as described with reference to FIG. 9.

At 1620, the method may include detecting that the cellular network link of the dual connectivity connection has failed. The operations of 1620 may be performed in accordance with examples as disclosed herein. In some examples, aspects of the operations of 1620 may be performed by a failure detection component 940 as described with reference to FIG. 9.

At 1625, the method may include transmitting, to the network entity, a report indicating the failure of the cellular network link using the wireless local area network link via a split signaling radio bearer, the report encapsulated in an internet protocol packet for delivery over the wireless local area network link. The operations of 1625 may be performed in accordance with examples as disclosed herein. In some examples, aspects of the operations of 1625 may be performed by a failure reporting component 945 as described with reference to FIG. 9.

At 1630, the method may include monitoring for a response to the report from the network entity. The operations of 1630 may be performed in accordance with examples as disclosed herein. In some examples, aspects of the operations of 1630 may be performed by a dual connectivity communication component 935 as described with reference to FIG. 9.

Figure 17:
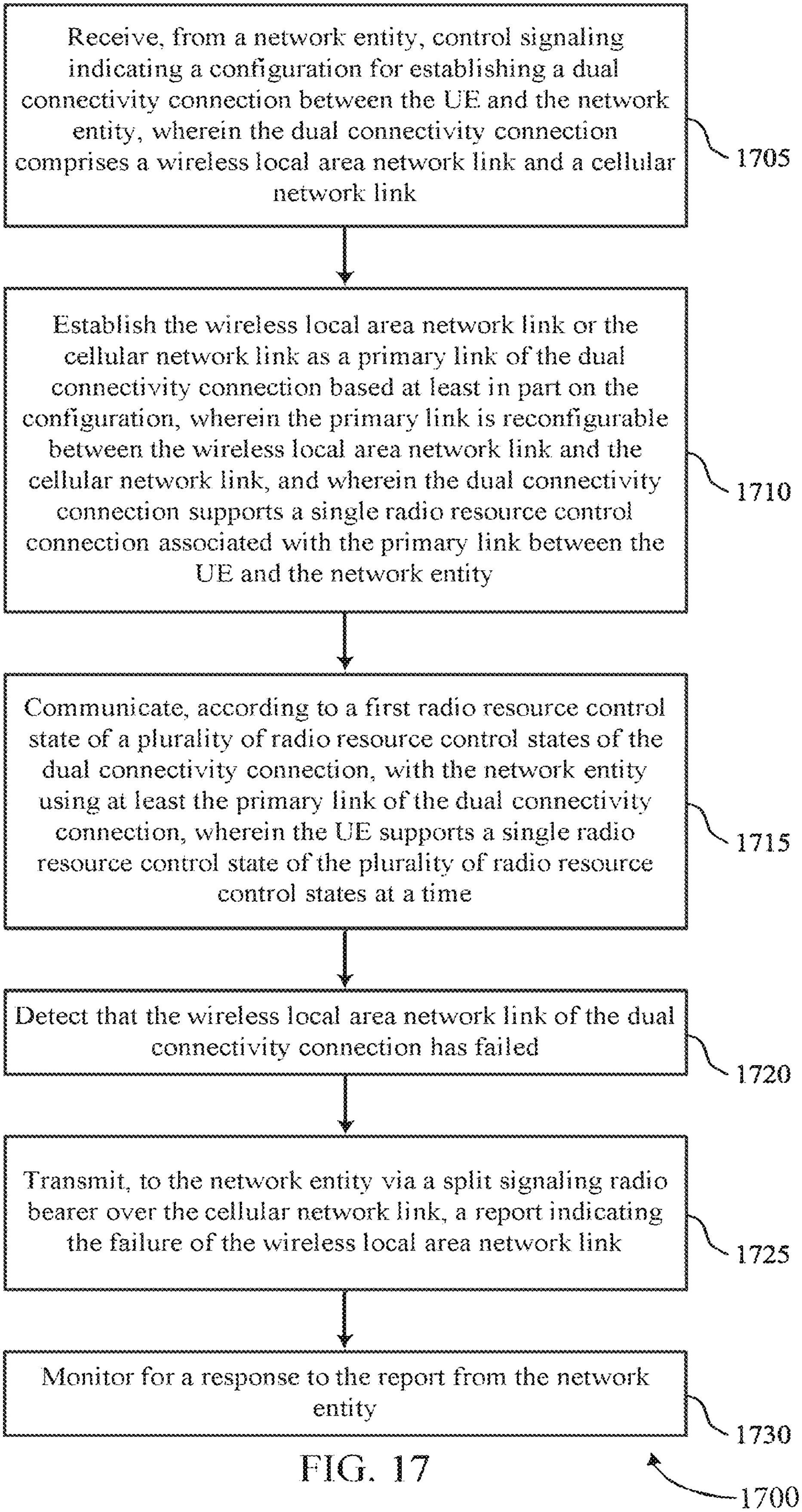

FIG. 17 shows a flowchart illustrating a method 1700 that supports radio resource state and recovery for wireless local area network and cellular network dual connectivity operation in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a network entity, control signaling indicating a configuration for establishing a dual connectivity connection between the UE and the network entity, where the dual connectivity connection includes a wireless local area network link and a cellular network link. The operations of 1705 may be performed in accordance with examples as disclosed herein. In some examples, aspects of the operations of 1705 may be performed by a control signaling reception component 925 as described with reference to FIG. 9.

At 1710, the method may include establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The operations of 1710 may be performed in accordance with examples as disclosed herein. In some examples, aspects of the operations of 1710 may be performed by a link establishment component 930 as described with reference to FIG. 9.

At 1715, the method may include communicating, according to a first radio resource control state of a set of multiple radio resource control states of the dual connectivity connection, with the network entity using at least the primary link of the dual connectivity connection, where the UE supports a single radio resource control state of the set of multiple radio resource control states at a time. The operations of 1715 may be performed in accordance with examples as disclosed herein. In some examples, aspects of the operations of 1715 may be performed by a dual connectivity communication component 935 as described with reference to FIG. 9.

At 1720, the method may include detecting that the wireless local area network link of the dual connectivity connection has failed. The operations of 1720 may be performed in accordance with examples as disclosed herein. In some examples, aspects of the operations of 1720 may be performed by a failure detection component 940 as described with reference to FIG. 9.

At 1725, the method may include transmitting, to the network entity via a split signaling radio bearer over the cellular network link, a report indicating the failure of the wireless local area network link. The operations of 1725 may be performed in accordance with examples as disclosed herein. In some examples, aspects of the operations of 1725 may be performed by a failure reporting component 945 as described with reference to FIG. 9.

At 1730, the method may include monitoring for a response to the report from the network entity. The operations of 1730 may be performed in accordance with examples as disclosed herein. In some examples, aspects of the operations of 1730 may be performed by a dual connectivity communication component 935 as described with reference to FIG. 9.

Figure 18:
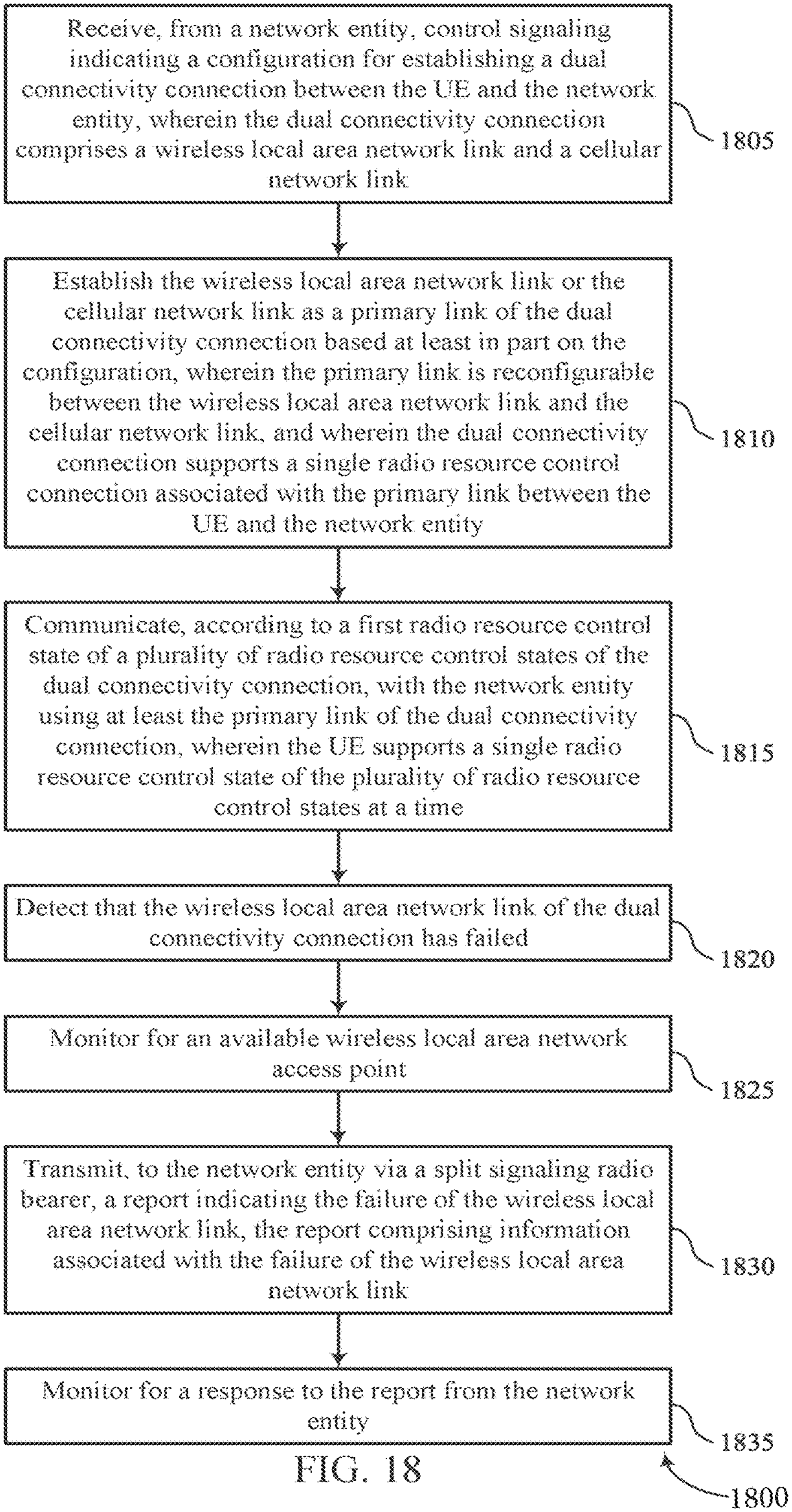

FIG. 18 shows a flowchart illustrating a method 1800 that supports radio resource state and recovery for wireless local area network and cellular network dual connectivity operation in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving, from a network entity, control signaling indicating a configuration for establishing a dual connectivity connection between the UE and the network entity, where the dual connectivity connection includes a wireless local area network link and a cellular network link. The operations of 1805 may be performed in accordance with examples as disclosed herein. In some examples, aspects of the operations of 1805 may be performed by a control signaling reception component 925 as described with reference to FIG. 9.

At 1810, the method may include establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The operations of 1810 may be performed in accordance with examples as disclosed herein. In some examples, aspects of the operations of 1810 may be performed by a link establishment component 930 as described with reference to FIG. 9.

At 1815, the method may include communicating, according to a first radio resource control state of a set of multiple radio resource control states of the dual connectivity connection, with the network entity using at least the primary link of the dual connectivity connection, where the UE supports a single radio resource control state of the set of multiple radio resource control states at a time. The operations of 1815 may be performed in accordance with examples as disclosed herein. In some examples, aspects of the operations of 1815 may be performed by a dual connectivity communication component 935 as described with reference to FIG. 9.

At 1820, the method may include detecting that the wireless local area network link of the dual connectivity connection has failed. The operations of 1820 may be performed in accordance with examples as disclosed herein. In some examples, aspects of the operations of 1820 may be performed by a failure detection component 940 as described with reference to FIG. 9.

At 1825, the method may include monitoring for an available wireless local area network access point. The operations of 1825 may be performed in accordance with examples as disclosed herein. In some examples, aspects of the operations of 1825 may be performed by a wireless local area network communication component 950 as described with reference to FIG. 9.

At 1830, the method may include transmitting, to the network entity via a split signaling radio bearer, a report indicating the failure of the wireless local area network link, the report including information associated with the failure of the wireless local area network link. The operations of 1830 may be performed in accordance with examples as disclosed herein. In some examples, aspects of the operations of 1830 may be performed by a failure reporting component 945 as described with reference to FIG. 9.

At 1835, the method may include monitoring for a response to the report from the network entity. The operations of 1835 may be performed in accordance with examples as disclosed herein. In some examples, aspects of the operations of 1835 may be performed by a dual connectivity communication component 935 as described with reference to FIG. 9.

Figure 19:
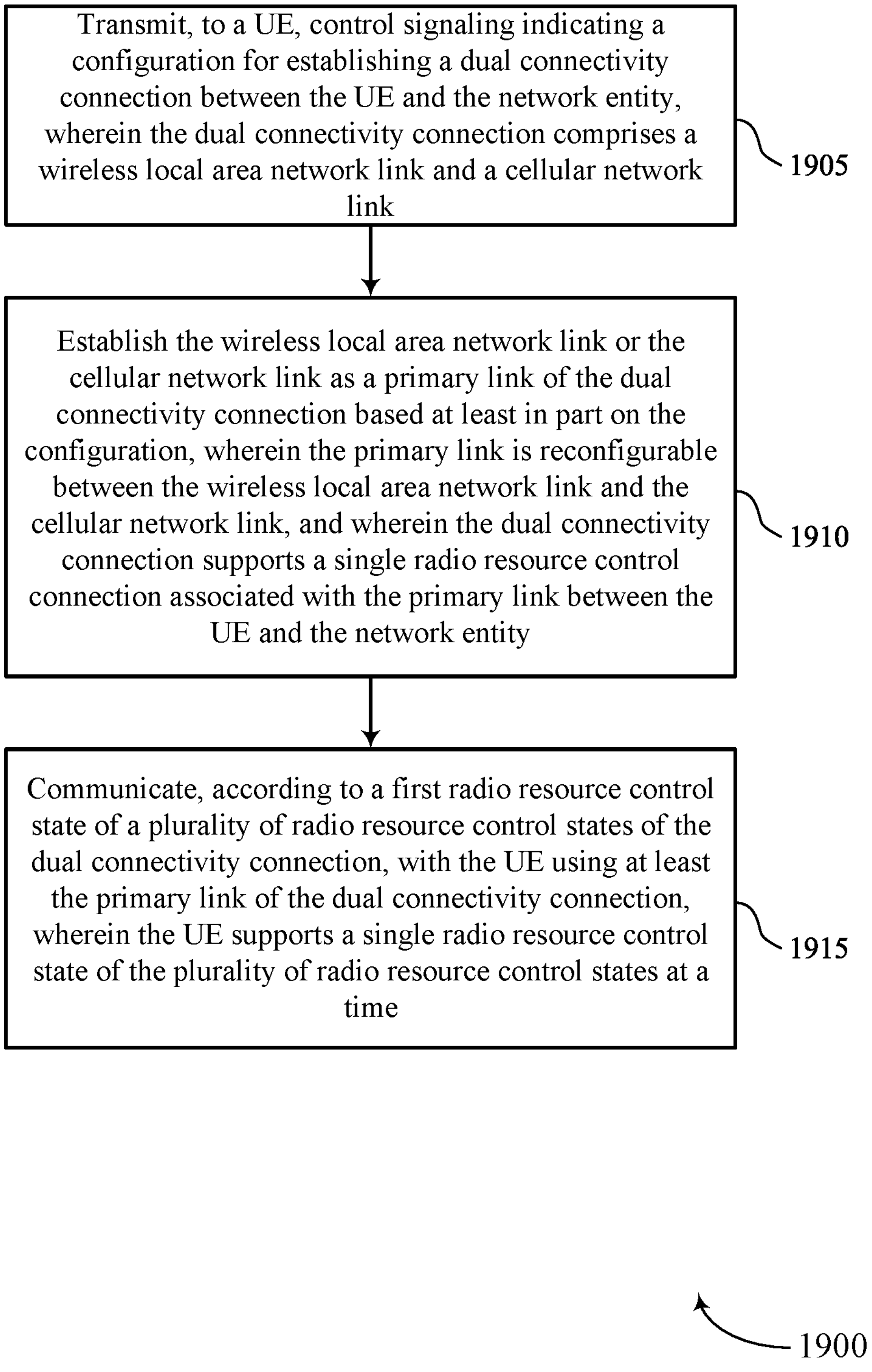

FIG. 19 shows a flowchart illustrating a method 1900 that supports radio resource state and recovery for wireless local area network and cellular network dual connectivity operation in accordance with aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally or alternatively, the network entity may perform aspects of the described functions using special-purpose hardware.

At 1905, the method may include transmitting, to a UE, control signaling indicating a configuration for establishing a dual connectivity connection between the UE and the network entity, where the dual connectivity connection includes a wireless local area network link and a cellular network link. The operations of 1905 may be performed in accordance with examples as disclosed herein. In some examples, aspects of the operations of 1905 may be performed by a control signaling module 1325 as described with reference to FIG. 13.

At 1910, the method may include establishing the wireless local area network link or the cellular network link as a primary link of the dual connectivity connection based on the configuration, where the primary link is reconfigurable between the wireless local area network link and the cellular network link, and where the dual connectivity connection supports a single radio resource control connection associated with the primary link between the UE and the network entity. The operations of 1910 may be performed in accordance with examples as disclosed herein. In some examples, aspects of the operations of 1910 may be performed by a link establishment module 1330 as described with reference to FIG. 13.

At 1915, the method may include communicating, according to a first radio resource control state of a set of multiple radio resource control states of the dual connectivity connection, with the UE using at least the primary link of the dual connectivity connection, where the UE supports a single radio resource control state of the set of multiple radio resource control states at a time. The operations of 1915 may be performed in accordance with examples as disclosed herein. In some examples, aspects of the operations of 1915 may be performed by a dual connectivity communication module 1335 as described with reference to FIG. 13.

The following provides an overview of aspects of the present disclosure:

Aspect 1: A method for wireless communications at a UE, comprising: receiving, from a network entity, control signaling indicating a configuration for establishing a dual connectivity connection between the UE and the network entity, wherein the dual connectivity connection comprises a wireless local area network link and a cellular network link; establishing the wireless local area network link or the cellular network link as a primary link of the dual connectivity connection based at least in part on the configuration, wherein the primary link is reconfigurable between the wireless local area network link and the cellular network link, and wherein the dual connectivity connection supports a single radio resource control connection associated with the primary link between the UE and the network entity; and communicating, according to a first radio resource control state of a plurality of radio resource control states of the dual connectivity connection, with the network entity using at least the primary link of the dual connectivity connection, wherein the UE supports a single radio resource control state of the plurality of radio resource control states at a time.

Aspect 2: The method of aspect 1, further comprising: detecting that the cellular network link of the dual connectivity connection has failed; transmitting, to the network entity, a report indicating the failure of the cellular network link using the wireless local area network link via a split signaling radio bearer, the report encapsulated in an internet protocol packet for delivery over the wireless local area network link; and monitoring for a response to the report from the network entity.

Aspect 3: The method of aspect 2, further comprising: starting a network response timer based at least in part on detecting that the cellular network link has failed; and transmitting a radio resource control reestablishment message based at least in part on the network response timer expiring and failing to receive a response to the report from the network entity.

Aspect 4: The method of any of aspects 2 through 3, wherein the cellular network link is established as the primary link, the method further comprising: suspending one or more data radio bearers associated with the cellular network link and one or more signal radio bearers associated with the cellular network link.

Aspect 5: The method of any of aspects 2 through 4, wherein the response to the report from the network entity comprises a hand-off command or an indication designating the wireless local area network link as the primary link; and the response to the report is encapsulated in a unicast internet protocol packet received over the wireless local area network link.

Aspect 6: The method of any of aspects 2 through 5, wherein transmitting the report comprises transmitting one or more measurements associated with the dual connectivity connection, a failure type associated with the failure of the cellular network link, a failure cause associated with the failure of the cellular network link, or a combination thereof.

Aspect 7: The method of any of aspects 1 through 6, wherein the wireless local area network link is established as the primary link, the method further comprising: detecting that the wireless local area network link of the dual connectivity connection has failed; transmitting, to the network entity via a split signaling radio bearer over the cellular network link, a report indicating the failure of the wireless local area network link; and monitoring for a response to the report from the network entity.

Aspect 8: The method of aspect 7, further comprising: starting a network response timer based at least in part on detecting that the wireless local area network link has failed; and transmitting a radio resource control reestablishment message based at least in part on the network response timer expiring and failing to receive a response to the report from the network entity.

Aspect 9: The method of any of aspects 7 through 8, further comprising: suspending one or more data radio bearers associated with the cellular network link.

Aspect 10: The method of any of aspects 7 through 9, wherein transmitting the report comprises transmitting one or more measurements associated with the dual connectivity connection, a failure type associated with the failure of the wireless local area network link, a failure cause associated with the failure of the wireless local area network link, or a combination thereof.

Aspect 11: The method of any of aspects 7 through 10, wherein detecting that the wireless local area network link has failed further comprises: detecting that a number of failed listen-before-talk attempts is greater than or equal to a listen-before-talk threshold, detecting that a reference signal received power associated with an access point is less than or equal to a reference signal received power threshold, or a combination thereof.

Aspect 12: The method of any of aspects 7 through 11, wherein the response to the report comprises an indication designating the cellular network link as the primary link, a wireless local area network modification message, one or more wireless local area network access point identifiers, or a combination thereof.

Aspect 13: The method of any of aspects 1 through 12, wherein the cellular network link is established as the primary link, the method further comprising: detecting that the wireless local area network link of the dual connectivity connection has failed; monitoring for an available wireless local area network access point; transmitting, to the network entity via a split signaling radio bearer, a report indicating the failure of the wireless local area network link, the report comprising information associated with the failure of the wireless local area network link; and monitoring for a response to the report from the network entity.

Aspect 14: The method of aspect 13, further comprising: associating with the available wireless local area network access point, wherein transmitting the report is based at least in part on the associating; wherein the information associated with the failure of the wireless local area network link comprises information associated with the associated available wireless local area network access point.

Aspect 15: The method of aspect 14, wherein the information associated with the associated available wireless local area network access point comprises an identifier of the associated available wireless local area network access point.

Aspect 16: The method of any of aspects 13 through 15, further comprising: failing to associate with the available wireless local area network access point; wherein transmitting the report comprises transmitting the report over the cellular network link.

Aspect 17: The method of any of aspects 13 through 16, further comprising: starting a network response timer based at least in part on detecting that the wireless local area network connection has failed; and transmitting a radio resource control reestablishment message based at least in part on the network response timer expiring and failing to receive a response to the report from the network entity.

Aspect 18: The method of any of aspects 13 through 17, further comprising: suspending one or more data radio bearers associated with the cellular network link.

Aspect 19: The method of any of aspects 13 through 18, wherein the information associated with the failure of the wireless local area network link comprises one or more measurements associated with the dual connectivity connection, a failure type associated with the failure of the wireless local area network link, a failure cause associated with the failure of the wireless local area network link, or a combination thereof.

Aspect 20: The method of any of aspects 13 through 19, further comprising: detecting that the wireless local area network link has failed further comprises detecting that a number of failed listen-before-talk attempts is greater than or equal to a listen-before-talk threshold, detecting that a reference signal received power associated with an access point is less than or equal to a reference signal received power threshold, or a combination thereof.

Aspect 21: The method of any of aspects 13 through 20, wherein the response to the report comprises a wireless local area network modification message, one or more wireless local area network access point identifiers, or a combination thereof.

Aspect 22: A method for wireless communications at a network entity, comprising: transmitting, to a UE, control signaling indicating a configuration for establishing a dual connectivity connection between the UE and the network entity, wherein the dual connectivity connection comprises a wireless local area network link and a cellular network link; establishing the wireless local area network link or the cellular network link as a primary link of the dual connectivity connection based at least in part on the configuration, wherein the primary link is reconfigurable between the wireless local area network link and the cellular network link, and wherein the dual connectivity connection supports a single radio resource control connection associated with the primary link between the UE and the network entity; and communicating, according to a first radio resource control state of a plurality of radio resource control states of the dual connectivity connection, with the UE using at least the primary link of the dual connectivity connection, wherein the UE supports a single radio resource control state of the plurality of radio resource control states at a time.

Aspect 23: The method of aspect 22, further comprising: determining the single radio resource control state based at least in part on an assessment of both the wireless local area network link and the cellular network link or based at least in part on an assessment of the primary link.

Aspect 24: The method of any of aspects 22 through 23, further comprising: receiving, from the UE, a report indicating the failure of the cellular network link using the wireless local area network link via a split signaling radio bearer, the report encapsulated in an internet protocol packet for delivery over the wireless local area network link; and transmitting, to the UE, a response to the report.

Aspect 25: The method of any of aspects 22 through 24, wherein the wireless local area network link is established as the primary link, the method further comprising: receiving, from the UE via a split signaling radio bearer over the cellular network link, a report indicating the failure of the wireless local area network link; and transmitting, to the UE, a response to the report.

Aspect 26: The method of any of aspects 22 through 25, wherein the cellular network link is established as the primary link, the method further comprising: receiving, from the UE via a split signaling radio bearer, a report indicating the failure of the wireless local area network link, the report comprising information associated with the failure of the wireless local area network link; and transmitting, to the UE, a response to the report.

Aspect 27: An apparatus for wireless communications at a UE, comprising a processor; memory coupled with the processor; and instructions stored in the memory and executable by the processor to cause the apparatus to perform a method of any of aspects 1 through 21.

Aspect 28: An apparatus for wireless communications at a UE, comprising at least one means for performing a method of any of aspects 1 through 21.

Aspect 29: A non-transitory computer-readable medium storing code for wireless communications at a UE, the code comprising instructions executable by a processor to perform a method of any of aspects 1 through 21.

Aspect 30: An apparatus for wireless communications at a network entity, comprising a processor; memory coupled with the processor; and instructions stored in the memory and executable by the processor to cause the apparatus to perform a method of any of aspects 22 through 26.

Aspect 31: An apparatus for wireless communications at a network entity, comprising at least one means for performing a method of any of aspects 22 through 26.

Aspect 32: A non-transitory computer-readable medium storing code for wireless communications at a network entity, the code comprising instructions executable by a processor to perform a method of any of aspects 22 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a network entity, control signaling indicating a configuration for establishing a dual connectivity connection between the UE and the network entity, wherein the dual connectivity connection comprises a wireless local area network link and a cellular network link;

establishing the wireless local area network link or the cellular network link as a primary link of the dual connectivity connection based at least in part on the configuration, wherein the primary link is reconfigurable between the wireless local area network link and the cellular network link, and wherein the dual connectivity connection supports a single radio resource control connection associated with the primary link between the UE and the network entity; and communicating, according to a first radio resource control state of a plurality of radio resource control states of the dual connectivity connection, with the network entity using at least the primary link of the dual connectivity connection, wherein the UE supports a single radio resource control state of the plurality of radio resource control states at a time.

2. The method of claim 1, further comprising:

detecting that the cellular network link of the dual connectivity connection has failed;

transmitting, to the network entity, a report indicating the failure of the cellular network link using the wireless local area network link via a split signaling radio bearer, the report encapsulated in an internet protocol packet for delivery over the wireless local area network link; and monitoring for a response to the report from the network entity.

3. The method of claim 2, further comprising:

starting a network response timer based at least in part on detecting that the cellular network link has failed; and transmitting a radio resource control reestablishment message based at least in part on the network response timer expiring and failing to receive a response to the report from the network entity.

4. The method of claim 2, wherein the cellular network link is established as the primary link, the method further comprising:

suspending one or more data radio bearers associated with the cellular network link and one or more signaling radio bearers associated with the cellular network link.

5. The method of claim 2, wherein:

the response to the report from the network entity comprises a hand-off command or an indication designating the wireless local area network link as the primary link; and the response to the report is encapsulated in a unicast internet protocol packet received over the wireless local area network link.

6. The method of claim 2, wherein transmitting the report comprises transmitting one or more measurements associated with the dual connectivity connection, a failure type associated with the failure of the cellular network link, a failure cause associated with the failure of the cellular network link, or a combination thereof.

7. The method of claim 1, wherein the wireless local area network link is established as the primary link, the method further comprising:

detecting that the wireless local area network link of the dual connectivity connection has failed;

transmitting, to the network entity via a split signaling radio bearer over the cellular network link, a report indicating the failure of the wireless local area network link; and monitoring for a response to the report from the network entity.

8. The method of claim 7, further comprising:

starting a network response timer based at least in part on detecting that the wireless local area network link has failed; and transmitting a radio resource control reestablishment message based at least in part on the network response timer expiring and failing to receive a response to the report from the network entity.

9. The method of claim 7, further comprising:

suspending one or more data radio bearers associated with the cellular network link.

10. The method of claim 7, wherein transmitting the report comprises transmitting one or more measurements associated with the dual connectivity connection, a failure type associated with the failure of the wireless local area network link, a failure cause associated with the failure of the wireless local area network link, or a combination thereof.

11. The method of claim 7, wherein detecting that the wireless local area network link has failed further comprises:

detecting that a number of failed listen-before-talk attempts is greater than or equal to a listen-before-talk threshold, detecting that a reference signal received power associated with an access point is less than or equal to a reference signal received power threshold, or a combination thereof.

12. The method of claim 7, wherein the response to the report comprises an indication designating the cellular network link as the primary link, a wireless local area network modification message, one or more wireless local area network access point identifiers, or a combination thereof.

13. The method of claim 1, wherein the cellular network link is established as the primary link, the method further comprising:

detecting that the wireless local area network link of the dual connectivity connection has failed;

monitoring for an available wireless local area network access point;

transmitting, to the network entity via a split signaling radio bearer, a report indicating the failure of the wireless local area network link, the report comprising information associated with the failure of the wireless local area network link; and monitoring for a response to the report from the network entity.

14. The method of claim 13, further comprising:

associating with the available wireless local area network access point, wherein transmitting the report is based at least in part on the associating;

wherein the information associated with the failure of the wireless local area network link comprises information associated with the associated available wireless local area network access point.

15. The method of claim 14, wherein the information associated with the associated available wireless local area network access point comprises an identifier of the associated available wireless local area network access point.

16. The method of claim 13, further comprising:

failing to associate with the available wireless local area network access point;

wherein transmitting the report comprises transmitting the report over the cellular network link.

17. The method of claim 13, further comprising:

starting a network response timer based at least in part on detecting that the wireless local area network link has failed; and transmitting a radio resource control reestablishment message based at least in part on the network response timer expiring and failing to receive a response to the report from the network entity.

18. The method of claim 13, further comprising:

suspending one or more data radio bearers associated with the cellular network link.

19. The method of claim 13, wherein the information associated with the failure of the wireless local area network link comprises one or more measurements associated with the dual connectivity connection, a failure type associated with the failure of the wireless local area network link, a failure cause associated with the failure of the wireless local area network link, or a combination thereof.

20. The method of claim 13, further comprising:

detecting that the wireless local area network link has failed further comprises detecting that a number of failed listen-before-talk attempts is greater than or equal to a listen-before-talk threshold, detecting that a reference signal received power associated with an access point is less than or equal to a reference signal received power threshold, or a combination thereof.

21. The method of claim 13, wherein the response to the report comprises a wireless local area network modification message, one or more wireless local area network access point identifiers, or a combination thereof.

22. A method for wireless communications at a network entity, comprising:

transmitting, to a user equipment (UE), control signaling indicating a configuration for establishing a dual connectivity connection between the UE and the network entity, wherein the dual connectivity connection comprises a wireless local area network link and a cellular network link;

establishing the wireless local area network link or the cellular network link as a primary link of the dual connectivity connection based at least in part on the configuration, wherein the primary link is reconfigurable between the wireless local area network link and the cellular network link, and wherein the dual connectivity connection supports a single radio resource control connection associated with the primary link between the UE and the network entity; and communicating, according to a first radio resource control state of a plurality of radio resource control states of the dual connectivity connection, with the UE using at least the primary link of the dual connectivity connection, wherein the UE supports a single radio resource control state of the plurality of radio resource control states at a time.

23. The method of claim 22, further comprising:

determining the single radio resource control state based at least in part on an assessment of both the wireless local area network link and the cellular network link or based at least in part on an assessment of the primary link.

24. The method of claim 22, further comprising:

receiving, from the UE, a report indicating the failure of the cellular network link using the wireless local area network link via a split signaling radio bearer, the report encapsulated in an internet protocol packet for delivery over the wireless local area network link; and transmitting, to the UE, a response to the report.

25. The method of claim 22, wherein the wireless local area network link is established as the primary link, the method further comprising:

receiving, from the UE via a split signaling radio bearer over the cellular network link, a report indicating the failure of the wireless local area network link; and transmitting, to the UE, a response to the report.

26. The method of claim 22, wherein the cellular network link is established as the primary link, the method further comprising:

receiving, from the UE via a split signaling radio bearer, a report indicating the failure of the wireless local area network link, the report comprising information associated with the failure of the wireless local area network link; and transmitting, to the UE, a response to the report.

27. An apparatus for wireless communications at a user equipment (UE), comprising:

a processor;

memory coupled with the processor; and instructions stored in the memory and executable by the processor to cause the apparatus to:

receive, from a network entity, control signaling indicating a configuration for establishing a dual connectivity connection between the UE and the network entity, wherein the dual connectivity connection comprises a wireless local area network link and a cellular network link;

establish the wireless local area network link or the cellular network link as a primary link of the dual connectivity connection based at least in part on the configuration, wherein the primary link is reconfigurable between the wireless local area network link and the cellular network link, and wherein the dual connectivity connection supports a single radio resource control connection associated with the primary link between the UE and the network entity; and communicate, according to a first radio resource control state of a plurality of radio resource control states of the dual connectivity connection, with the network entity using at least the primary link of the dual connectivity connection, wherein the UE supports a single radio resource control state of the plurality of radio resource control states at a time.

28. The apparatus of claim 27, wherein the instructions are further executable by the processor to cause the apparatus to:

detect that the cellular network link of the dual connectivity connection has failed;

transmit, to the network entity, a report indicating the failure of the cellular network link using the wireless local area network link via a split signaling radio bearer, the report encapsulated in an internet protocol packet for delivery over the wireless local area network link; and monitor for a response to the report from the network entity.

29. The apparatus of claim 27, wherein the wireless local area network link is established as the primary link, and the instructions are further executable by the processor to cause the apparatus to:

detect that the wireless local area network link of the dual connectivity connection has failed;

transmit, to the network entity via a split signaling radio bearer over the cellular network link, a report indicating the failure of the wireless local area network link; and monitor for a response to the report from the network entity.

30. A non-transitory computer-readable medium storing code for wireless communications at a user equipment (UE), the code comprising instructions executable by a processor to:

receive, from a network entity, control signaling indicating a configuration for establishing a dual connectivity connection between the UE and the network entity, wherein the dual connectivity connection comprises a wireless local area network link and a cellular network link;

establish the wireless local area network link or the cellular network link as a primary link of the dual connectivity connection based at least in part on the configuration, wherein the primary link is reconfigurable between the wireless local area network link and the cellular network link, and wherein the dual connectivity connection supports a single radio resource control connection associated with the primary link between the UE and the network entity; and communicate, according to a first radio resource control state of a plurality of radio resource control states of the dual connectivity connection, with the network entity using at least the primary link of the dual connectivity connection, wherein the UE supports a single radio resource control state of the plurality of radio resource control states at a time.

* * * * *